(12) United States Patent
Jang et al.

(10) Patent No.: US 12,458,881 B2
(45) Date of Patent: Nov. 4, 2025

(54) DISPLAY DEVICE AND OPERATING METHOD THEREOF

(71) Applicant: SAMSUNG ELECTRONICS CO., LTD., Suwon-si (KR)

(72) Inventors: Sungchang Jang, Suwon-si (KR); Beomeun Kim, Suwon-si (KR); Yongwoo Shin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 403 days.

(21) Appl. No.: 17/987,467

(22) Filed: Nov. 15, 2022

(65) Prior Publication Data

US 2023/0100652 A1    Mar. 30, 2023

Related U.S. Application Data

(63) Continuation of application No. PCT/KR2022/013196, filed on Sep. 2, 2022.

(30) Foreign Application Priority Data

Sep. 2, 2021 (KR) .................. 10-2021-0117197

(51) Int. Cl.
*A63F 13/50* (2014.01)
*G06F 3/147* (2006.01)
*G06T 3/40* (2024.01)

(52) U.S. Cl.
CPC .............. *A63F 13/50* (2014.09); *G06F 3/147* (2013.01); *G06T 3/40* (2013.01)

(58) Field of Classification Search
None
See application file for complete search history.

(56) References Cited

U.S. PATENT DOCUMENTS

| | | | |
|---|---|---|---|
| 8,732,772 B2 | 5/2014 | Kim | |
| 10,638,169 B2 | 4/2020 | Su et al. | |
| 10,795,831 B2 * | 10/2020 | Ihara | G09G 5/14 |
| 10,810,789 B2 * | 10/2020 | Kim | G06F 3/04847 |
| 11,127,329 B2 * | 9/2021 | Hsieh | G06F 3/1454 |
| 11,321,040 B2 * | 5/2022 | Jeong | H04N 21/4122 |
| 11,360,728 B2 | 6/2022 | Kim et al. | |

(Continued)

FOREIGN PATENT DOCUMENTS

| | | |
|---|---|---|
| KR | 10-0503794 | 7/2005 |
| KR | 10-0732959 | 6/2007 |

(Continued)

OTHER PUBLICATIONS

International Search Report dated Dec. 6, 2022 issued in International Application No. PCT/KR2022/013196 (10 pages).

(Continued)

*Primary Examiner* — Ronald Laneau
(74) *Attorney, Agent, or Firm* — NIXON & VANDERHYE P.C.

(57) ABSTRACT

Provided is a display device including: a display, a communication interface comprising communication circuitry configured to communicate with a source device, and a processor configured to execute at least one instruction. When an aspect ratio of an image corresponding to content is changed, the display device may output an optimized full screen in response to the change of the aspect ratio.

20 Claims, 26 Drawing Sheets

(56) References Cited

U.S. PATENT DOCUMENTS

| | | |
|---|---|---|
| 2004/0088724 A1 | 5/2004 | Hwang et al. |
| 2008/0088740 A1 | 4/2008 | Kondo |
| 2010/0026721 A1 | 2/2010 | Park et al. |
| 2010/0180304 A1 | 7/2010 | Hassell et al. |
| 2014/0269932 A1 | 9/2014 | Su et al. |
| 2018/0098018 A1 | 4/2018 | Cho et al. |
| 2018/0364881 A1* | 12/2018 | Lee et al. |
| 2022/0076612 A1* | 3/2022 | Nagao .................... G03B 17/18 |

FOREIGN PATENT DOCUMENTS

| | | |
|---|---|---|
| KR | 10-0772416 | 10/2007 |
| KR | 10-2010-0013106 A | 2/2010 |
| KR | 10-2010-0046398 | 5/2010 |
| KR | 10-2012-0119133 | 10/2012 |
| KR | 10-1245158 | 3/2013 |
| KR | 10-2015-0126860 A | 11/2015 |
| KR | 10-2016-0140304 A | 12/2016 |
| KR | 10-2017-0111003 A | 10/2017 |
| KR | 10-1829834 | 2/2018 |
| KR | 10-2019123 | 9/2019 |
| KR | 10-2063952 | 1/2020 |
| KR | 10-2020-0075809 | 6/2020 |

OTHER PUBLICATIONS

Extended European Search Report dated Sep. 27, 2024 issued in European Patent Application No. 22865089.1.

* cited by examiner

DISPLAY DEVICE AND OPERATING METHOD THEREOF

CROSS-REFERENCE TO RELATED APPLICATIONS

This application is a continuation of International Application No. PCT/KR2022/013196 designating the United States, filed on Sep. 2, 2022, in the Korean Intellectual Property Receiving Office and claiming priority to Korean Patent Application No. 10-2021-0117197, filed on Sep. 2, 2021, in the Korean Intellectual Property Office, the disclosures of which are incorporated by reference herein in their entireties.

BACKGROUND

Field

The disclosure relates to a display device capable of reproducing content and an operating method thereof.

For example, the disclosure relates to a display device capable of supporting output of images having various aspect ratios to reproduce content (e.g., game content) in a wide screen mode and an operating method thereof.

Description of Related Art

Due to the development of display device technologies, display devices capable of implementing various functions have been developed.

Televisions (TVs) are a representative example of the display devices. Existing TVs merely receive broadcast signals and reproduce broadcast content corresponding thereto (e.g., news, dramas, and music programs).

Currently, due to the development of display device technologies, various applications or programs for performing various functions may be stored and installed on the TVs, and various functions and services other than the broadcast content reproduction function may also be provided using the installed applications. For example, a game application may be stored and installed on a TV, and game content may be executed using the game application.

In addition, due to the development of communication technologies and communication connection functions of display devices, display devices have been developed to provide various functions or services through wired or wireless communication with external devices. For example, a display device may be connected to an external device (e.g., a source device or a game console) through wired or wireless communication, and receive content (e.g., game content) from the external device (e.g., the game console) through the wired or wireless communication.

A method and apparatus capable of outputting a reproduction screen of game content so as to increase user satisfaction when the game content is provided through a display device is required.

For example, a method and apparatus capable of increasing user satisfaction in using content by flexibly changing and outputting a full screen when an aspect ratio of game content reproduced on a display device capable of supporting output in various aspect ratios is changed are required.

SUMMARY

Embodiments of the disclosure provide a display device capable of outputting an optimized full screen in response to a change of an aspect ratio of an image corresponding to content, and an operating method thereof.

Embodiments of the disclosure provide a display device capable of reproducing game content and of outputting an optimized full screen in response to a change of an aspect ratio of an image of received game content (e.g., a game image), and an operating method thereof.

Embodiments of the disclosure provide a display device capable of outputting an optimized full screen by flexibly changing enlargement of a partial area set in a game image, in response to a change of an aspect ratio of the game image after the game image is displayed, and an operating method thereof.

According to an example embodiment of the disclosure, a display device includes: a display, a communication interface comprising communication circuitry configured to communicate with a source device, and a processor configured to execute at least one instruction. The processor may be further configured to execute the at least one instruction to control the display device to: receive, from the source device, a first image corresponding to a first aspect ratio based on a first partial area being identified in the first image, display a first full screen including the first image and a first enlarged image corresponding to the first partial area based on a second image corresponding to a second aspect ratio different from the first aspect ratio being received from the source device, identify, in the second image, a second partial area corresponding to the first partial area based on the first and second aspect ratios, and display a second full screen including the second image and a second enlarged image corresponding to the identified second partial area.

The processor may be further configured to execute the at least one instruction to: identify, in the second image, the second partial area including the same image object as an image object included in the first partial area in the first image, based on the first and second aspect ratios, and obtain the second enlarged image corresponding to the identified second partial area.

The processor may be further configured to execute the at least one instruction to: control the communication interface to receive the second image having the second aspect ratio from the source device, based on an input received while the first image is being received from the source device.

The processor may be further configured to execute the at least one instruction to: identify, as the first partial area, an area including at least one of a moving object, a minimap, an item window, a character window, a chat window, or a current status information window, in the first image, and obtain the first enlarged image corresponding to the first partial area.

The processor may be further configured to execute the at least one instruction to: identify the first partial area, based on an input for selecting a partial area in the first image.

The display device may further include a user interface configured to: receive an input, The processor may be further configured to execute the at least one instruction to: control the display device to display a user interface screen for displaying one or more guidance areas on the first image, and identify the first partial area, based on an input for selecting at least one of the one or more guidance areas.

The processor may be further configured to execute the at least one instruction to: recognize one or more image objects corresponding to one or more of a minimap, a moving object, an item window, a character window, a chat window, and a current status information window in the first image, control the display to display a user interface screen for selecting at least one of the recognized one or more image objects, and identify the first partial area, based on an input for selecting at least one of the one or more image objects.

The processor may be further configured to execute the at least one instruction to: based on an aspect ratio of the display being the same as the second aspect ratio, split a full screen of the display into two partial screens, and control the display to display the second image in one partial screen and display the second enlarged image in the other partial screen.

The processor may be further configured to execute the at least one instruction to: based on an aspect ratio of the display being different from the second aspect ratio, control the display to display the second enlarged image on at least a part of a remaining area other than an area where the second image is displayed on a full screen of the display.

The processor may be further configured to execute the at least one instruction to: adjust a size the second enlarged image to increase screen use efficiency of the remaining area, and control the display to display the size-adjusted second enlarged image on the remaining area.

The processor may be further configured to execute the at least one instruction to: adjust at least one of a size or a position of the second enlarged image included in the second full screen, based on the second aspect ratio and a full screen aspect ratio of the display.

The first image may include an image corresponding to game content corresponding to the first aspect ratio. The second image may include an image corresponding to game content corresponding to the second aspect ratio.

The processor may be further configured to execute the at least one instruction to: identify, as the first partial area, an area including a minimap in the first image corresponding to a reproduction image of game content, generate a first enlarged image corresponding to the first partial area, and control the display to display the first full screen including the first enlarged image and the first image.

According to an example embodiment of the disclosure, a method of operating a display device includes: receiving, from a source device, a first image corresponding to a first aspect ratio based on a first partial area being identified in the first image, displaying a first full screen including the first image and a first enlarged image corresponding to the first partial area, receiving, from the source device, a second image corresponding to a second aspect ratio different from the first aspect ratio, identifying, in the second image, a second partial area corresponding to the first partial area based on the first and second aspect ratios, and displaying a second full screen including the second image and a second enlarged image corresponding to the identified second partial area.

The identifying of the second partial area may include identifying, in the second image, the second partial area including the same image object as an image object included in the first partial area in the first image, based on the first and second aspect ratios, and obtaining the second enlarged image corresponding to the identified second partial area.

The displaying of the first full screen may include identifying, as the first partial area, an area where at least one of a moving object, a minimap, an item window, a character window, a chat window, or a current status information window, in the first image, and obtaining the first enlarged image corresponding to the first partial area.

The method may further include displaying a user interface screen for displaying one or more guidance areas on the first image, and identifying the first partial area, based on an input for selecting at least one of the one or more guidance areas.

The method may further include recognizing one or more image objects corresponding to one or more of a minimap, a moving object, an item window, a character window, a chat window, and a current status information window in the first image, displaying a user interface screen for selecting at least one of the recognized one or more image objects, and identifying the first partial area, based on an input for selecting at least one of the one or more image objects.

The displaying of the second full screen may include, based on an aspect ratio of the display being different from the second aspect ratio, displaying the second enlarged image on at least a part of a remaining area other than an area where the second image is displayed on a full screen of a display in the display device.

The displaying of the second full screen may further include adjusting at least one of a size or a position of the second enlarged image included in the second full screen, based on the second aspect ratio and a full screen aspect ratio of a display in the display device.

Using a display device and an operating method thereof, according to various example embodiments of the disclosure, when an aspect ratio of a game image corresponding to game content is changed, an optimized full screen may be output in response to the change of the aspect ratio, thereby minimizing/reducing inconvenience of a game user and increasing satisfaction of the game user.

For example, using a display device and an operating method thereof, according to various example embodiments of the disclosure, when an aspect ratio of a game image set with a partial area to be enlarged is changed after the game image is displayed, enlargement of the partial area may be automatically changed based on the changed aspect ratio, thereby preventing/reducing an enlarged image display error caused by the change of the aspect ratio of the game image. As such, according to an example embodiment of the disclosure, satisfaction of a game user may be increased.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
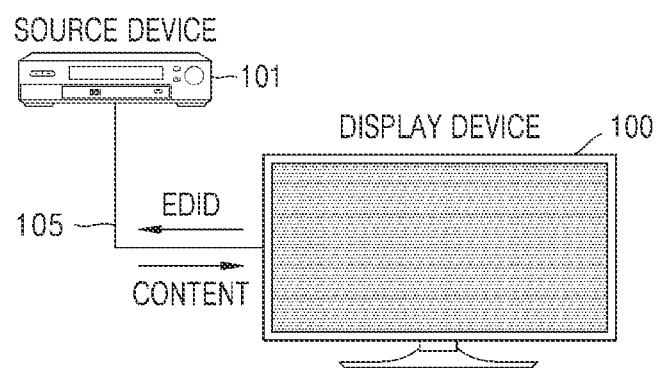
FIG. 1 is a diagram illustrating a display device for receiving content from a source device according to various embodiments.

Hereinafter, the disclosure will be described in greater detail by explaining various example embodiments of the disclosure with reference to the attached drawings. The disclosure may, however, be embodied in many different forms and should not be construed as being limited to the example embodiments of the disclosure set forth herein. In the drawings, parts not related to the disclosure may not be illustrated for clarity of explanation, and like elements are denoted by like reference numerals throughout. In addition, throughout the drawings, the same elements are denoted by the same reference numerals.

Throughout the disclosure, when an element is referred to as being "connected to" another element, the element can be "directly connected to" the other element or be "electrically connected to" the other element via an intervening element. The terms "comprises", "comprising", "includes" and/or "including", when used herein, specify the presence of stated elements, but do not preclude the presence or addition of one or more other elements.

The phrase "an embodiment of the disclosure" at various parts of this disclosure does not always designate the same embodiment of the disclosure.

An embodiment of the disclosure may be represented as functional blocks and various processing steps. Some or all of the functional blocks may be implemented by various numbers of hardware and/or software elements configured to perform certain functions. For example, the functional blocks of the disclosure may be implemented by one or more processors or microprocessors or implemented by circuit elements configured to perform intended functions. As another example, the functional blocks of the disclosure may be implemented using various programming or scripting languages. The functional blocks may be implemented using algorithms executed by one or more processors. Furthermore, the disclosure might employ known technologies for electronic settings, signal processing, and/or data processing. Terms such as "module" and "element" may be widely used and are not limited to mechanical and physical elements.

In addition, connection lines or connection members between elements shown in the drawings merely illustrate examples of functional connections and/or physical or circuit connections. Connections between elements may be represented by replaceable or additional various functional connections, physical connections, or circuit connections in an actual device.

The expression "at least one of A, B, or C" indicates only A, only B, only C, both A and B, both A and C, both B and C, all of A, B, and C, or variations thereof.

In an embodiment of the disclosure, a display device may refer to any electronic device capable of receiving content from a source device and of displaying a screen corresponding thereto. Herein, the content may include, for example, game content, lecture content, cinema content, or home training service content.

For example, the display device according to an embodiment of the disclosure may refer, for example, to any electronic device capable of selectively displaying at least one type of content, and may be provided in various forms, e.g., a television (TV), a smart TV, a digital broadcast receiver, a tablet PC, a smartphone, a mobile phone, a computer, a laptop computer, or the like. The display device may have a stationary form, a mobile form, or a form portable by a user.

FIG. 1 is a diagram illustrating an example display device for receiving content from a source device according to various embodiments.

Referring to FIG. 1, a display device 100 may be connected to a source device 101 through a wired or wireless communication network.

The source device 101 may provide content such as video/audio content to the display device 100. The source device 101 may be a video game console. As another example, the source device 101 may include various types of electronic devices capable of providing content to the display device 100, e.g., a video game console, a set-top box, a digital versatile disc (DVD) player, a Blu-ray disc player, a personal computer (PC), and a game machine. The source device 101 may be referred to as a source device in terms of providing content, and also be referred to as a host device, a content providing device, an electronic device, a storage device, a computing device, a server device, a server, or the like.

The display device 100 may output or display the content received from the source device 101. The display device 100 may include various types of electronic devices capable of receiving and outputting content, e.g., a network TV, a smart TV, an Internet TV, a web TV, an Internet Protocol TV (IPTV), and a PC. The display device 100 may be referred to as a display device in terms of receiving and displaying content, and also be referred to as a content receiving device, a sink device, an electronic device, a computing device, or the like.

The source device 101 and the display device 100 may be connected through wired connection means for forming a wired network, to perform data transmission or reception therebetween. For example, the wired connection means may include a cable, and each of the source device 101 and the display device 100 may include one or more ports for cable connection. The one or more ports may include, for example, a high-definition multimedia interface (HDMI) port, a display port, and a digital input interface such as a type-C port.

The source device 101 and the display device 100 may be connected through wireless connection means for forming a wireless network, to perform data transmission or reception therebetween. For example, the wireless connection means may include a wireless HDMI communication module, and each of the source device 101 and the display device 100 may include the wireless HDMI communication module. As another example, the wireless connection means may include at least one communication module (not shown) for performing communication according to a communication standard such as Bluetooth, Wi-Fi, Bluetooth low energy (BLE), near-field communication (NFC)/radio frequency identification (RFID), Wi-Fi direct, ultra-wideband (UWB), Zigbee, Internet, $3^{rd}$ generation (3G), 4th generation (4G), 5th generation (5G), and/or 6th generation (6G).

In FIG. 1, a case in which the source device 101 and the display device 100 are connected through an HDMI cable 105 for performing wired HDMI communication is shown as a non-limiting example.

For example, each of the source device 101 and the display device 100 may include an HDMI port, and perform communication through the HDMI cable 105 connected to the HDMI port. To provide content to the display device 100, the source device 101 may initially receive extended display identification data (EDID) provided by the display device 100, generate content in a format corresponding to the received EDID, and provide the generated content to the display device 100.

The EDID may refer, for example, to data or information that defines display performance or capability of the display device 100 in displaying content. For example, the EDID may include at least one of manufacturer information, product information, EDID version information, timing information, screen size information, brightness information, or pixel information of the display device 100. Herein, the screen size information may include information about at least one of a resolution or an aspect ratio providable by the display device 100.

The source device 101 may obtain the EDID provided by the display device 100, generate content to be provided to the display device 100, in a format based on the obtained EDID, and provide the generated content to the display device 100. For example, when an aspect ratio identified based on the obtained EDID (specifically, a value of the identified aspect ratio) is 32:9, the source device 101 may generate an image having the identified aspect ratio of 32:9, and transmit the generated image to the display device 100. That is, the source device 101 having received the EDID from the display device 100 may provide the display device 100 with content in a format suitable for the display performance of the display device 100. Herein, the image is an image corresponding to the content, and may include a reproduction screen of the content, a menu screen of the content, or the like.

Although it is described that 'the image is transmitted' for convenience in explaining an embodiment of the disclosure, it may refer, for example, to an image signal corresponding to the image, a packet or stream including the image signal, or audio/video (AV) data including the image signal being transmitted.

In the following description, images displayed on a display device capable of supporting output in various aspect ratios are described in greater detail below with reference to FIGS. 2 and 3.

Figure 2:
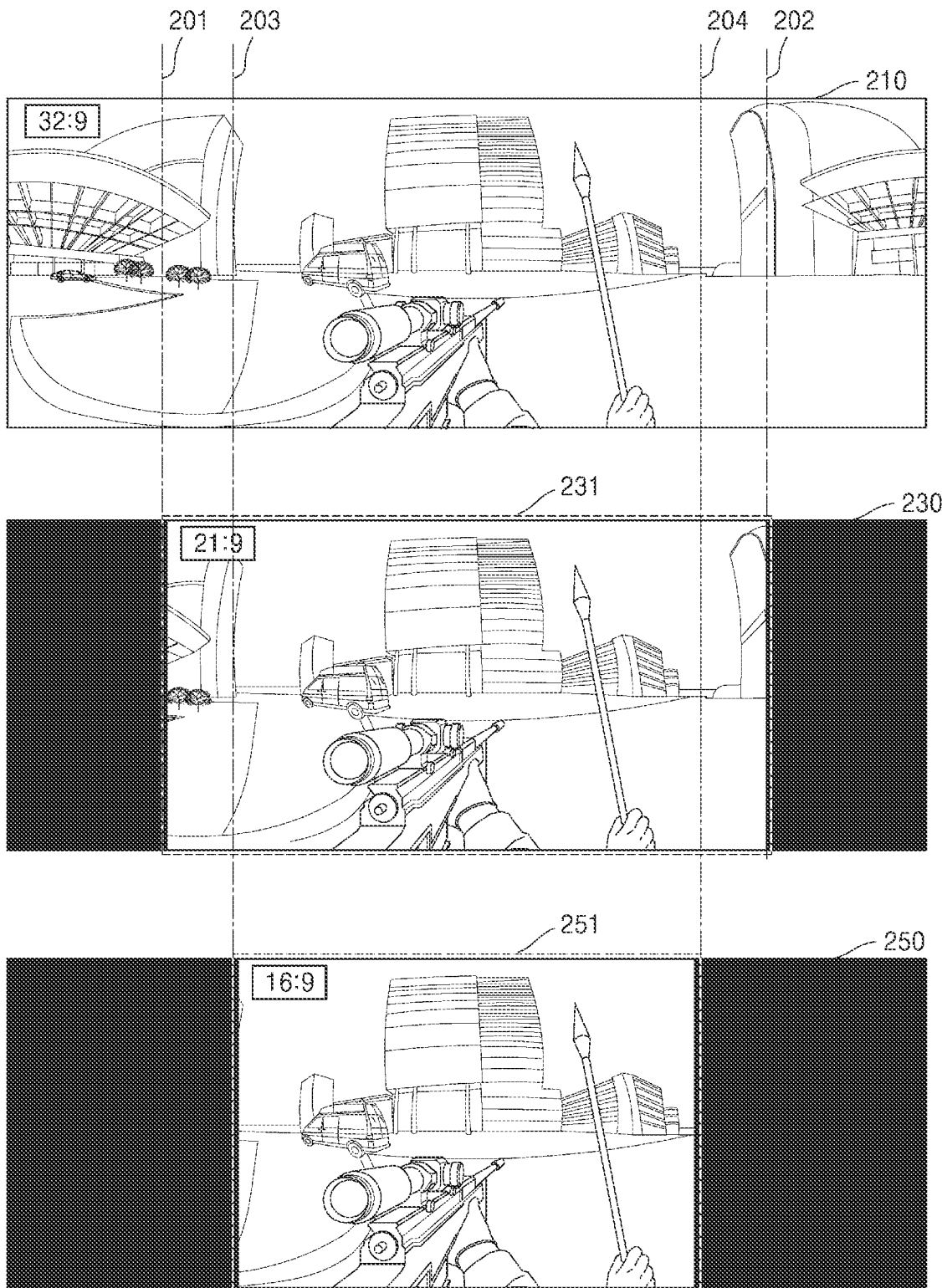
FIG. 2 is a diagram a display device capable of supporting output in various aspect ratios according to various embodiments.

FIG. 2 is a diagram illustrating an example display device capable of supporting output in various aspect ratios according to various embodiments.

The display device 100 according to an embodiment of the disclosure may support output of screens having a plurality of aspect ratios. Herein, the aspect ratio refers to a ratio of a horizontal length to a vertical length of a screen, and may be represented by a value such as 4:3, 16:9, 16:10, 21:9, or 32:9. Because the aspect ratio indicates a ratio of a width to a height of an output screen or image, it may also be referred to as a 'screen ratio' or an 'image ratio'. The aspect ratio of a screen may be optimized based on the type of an input image.

For example, an aspect ratio capable of increasing user satisfaction may be selected based on the type of an image output through the screen.

For example, an aspect ratio of 16:9 is the most commonly used screen ratio, and may be used to output menu screens or computer screens. As another example, an aspect ratio of 21:9 may be used to be provided with more information in a horizontal direction (or widthwise direction), e.g., cinema screens or game screens. As another example, an aspect ratio of 32:9 may be used to output an image for providing or being provided with a wide field of view (FoV). For example, the aspect ratio of 32:9 may be used a lot for games provided using a 360° image or a panorama image to increase user satisfaction, e.g., sports games, racing games, or battle games.

When an image of the same game content is displayed, a different angle of view (AoV) may be provided depending on an aspect ratio of the image. For example, when the aspect ratio of the image is increased in a horizontal direction, a wider FoV or AoV may be provided. For example, a wide FoV or AoV may be provided in the order of the aspect ratio of 32:9, the aspect ratio of 21:9, and the aspect ratio of 16:9.

Referring to FIG. 2, an image 210 having an aspect ratio of 32:9, an image 230 having an aspect ratio of 21:9, and an image 250 having an aspect ratio of 16:9 are shown.

For example, a wide AoV may be provided in the order of the image 210 having an aspect ratio of 32:9, the image 230 having an aspect ratio of 21:9, and the image 250 having an aspect ratio of 16:9.

Referring to FIG. 2, the image 210 having an aspect ratio of 32:9 may provide the widest AoV. Compared to the image 210 having an aspect ratio of 32:9, the image 230 having an aspect ratio of 21:9 may not provide a FoV for an area to the left of line 201 and an area to the right of line 202, but provide a FoV for an area 231 between lines 201 and 202. Compared to the image 210 having an aspect ratio of 32:9, the image 250 having an aspect ratio of 16:9 may not provide a FoV for an area to the left of line 203 and an area to the right of line 204, but provide a FoV for an area 251 between lines 203 and 204.

As described above, the image 210 having an aspect ratio of 32:9 may have a wider AoV compared to the image 230 having an aspect ratio of 21:9 or the image 250 having an aspect ratio of 16:9 and thus provide more information to a user who is provided with the game content. For example, when a certain area based on a position of the user in a 360° image or a panorama image is displayed as an image of the game content, the image 210 having an aspect ratio of 32:9 may provide the widest AoV from among the images 210, 230, and 250 shown in FIG. 2. As such, the user who uses the game content may play the game more realistically and immersively while viewing the widest-AoV image.

In general game content, a game user who has a wider FoV during the game may be provided with more information from a provided image, and thus be advantageous to win the game. Therefore, most game users want to be provided with a game content image having an even slightly wider AoV. Herein, the game user may include not only a user who plays the game but also a user who watches the game.

Therefore, when the game content is reproduced, the display device 100 capable of supporting output of images corresponding to a plurality of aspect ratios may display the image in an aspect ratio which is the widest in a horizontal direction from among the plurality of aspect ratios (e.g., an aspect ratio of 32:9 from among aspect ratios of 32:9, 21:9, and 16:9).

Figure 3:
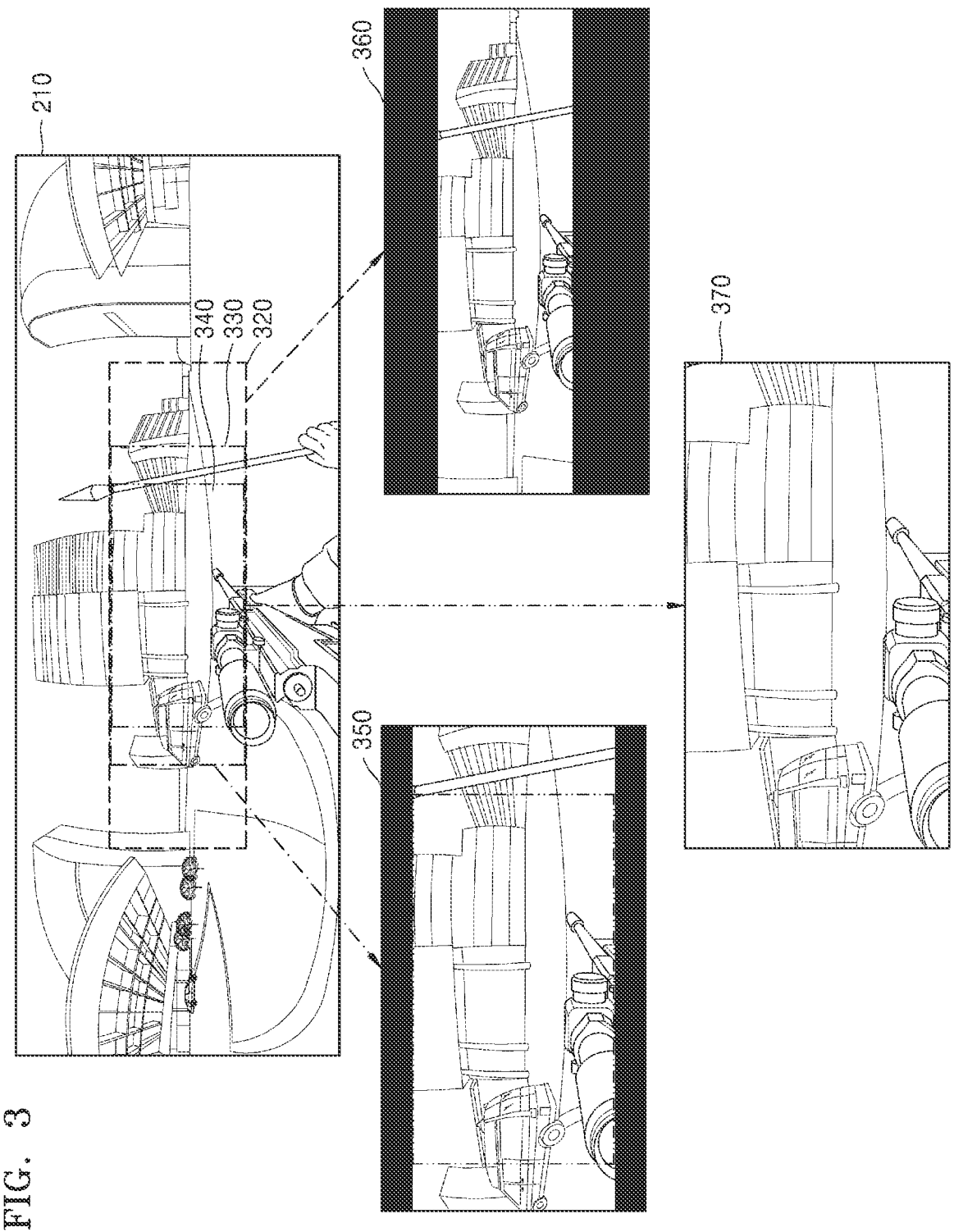
FIG. 3 is describing diagram illustrating a display device capable of supporting output in various aspect ratios according to various embodiments.

FIG. 3 is diagram illustrating an example display device capable of supporting output in various aspect ratios according to various embodiments.

FIG. 3 shows, as an example, screens output on the display device 100 when a radio of a horizontal length to a vertical length of a display (or display panel) included in the display device 100 is 16:9. That is, '16:9' may be a physical aspect ratio of the display device 100 or a full screen aspect ratio of the display device 100.

For example, assuming three-dimensional (3D) game content, the source device 101 may store a 360° image 210 corresponding to the game content. In FIG. 3, a case in which the 360° image 210 is the same as the image shown in FIG. 2 and having an aspect ratio of 32:9 is shown as an example. The source device 101 may transmit, to the display device 100, an image corresponding to a current FoV and having an aspect ratio identified based on EDID of the display device 100.

For example, when the aspect ratio identified based on the EDID of the display device 100 is 16:9, the source device 101 may transmit, to the display device 100, an image 340 having an aspect ratio of 16:9. When the image is transmitted, it may refer, for example, to image data corresponding to the image being transmitted. The display device 100 may output a full screen 370 corresponding to the received image 340. Because the aspect ratio of the received image 340 and the physical aspect ratio of a display included in the display device 100 are equally 16:9, the full screen 370 may display the image 340 without a black area.

As another example, when the aspect ratio identified based on the EDID of the display device 100 is 21:9, the source device 101 may transmit, to the display device 100, an image 330 having an aspect ratio of 21:9. Then, the display device 100 may output a full screen 350 corresponding to the received image 330. Because the aspect ratio of the received image 330 is different from the physical aspect ratio of the display included in the display device 100, the full screen 350 may display the image 330 together with a black area.

As another example, when the aspect ratio identified based on the EDID of the display device 100 is 32:9, the source device 101 may transmit, to the display device 100, an image 320 having an aspect ratio of 32:9. The display device 100 may output a full screen 360 corresponding to the received image 320. Because the aspect ratio of the received image 320 is different from the physical aspect ratio of the display included in the display device 100, the full screen 360 may display the image 320 together with a wider black area compared to the full screen 350.

As described above in relation to FIGS. 1, 2 and 3 (which may be referred to as FIGS. 1 to 3), a display device according to an embodiment of the disclosure may support output of images having various aspect ratios. Embodiments of the disclosure relate to a method and apparatus capable of minimizing/reducing output screen errors and/or user inconvenience caused when an aspect ratio of an image is changed in a display device capable of supporting output of images having different aspect ratios, and a description thereof is now provided in greater detail below with reference to FIGS. 4 to 25. In FIGS. 4 to 25, examples in which a radio of a horizontal length to a vertical length of a display (or display panel) included in a display device according to various example embodiments of the disclosure is 16:9 as described above in relation to FIG. 3 is shown as an example.

Figure 4:
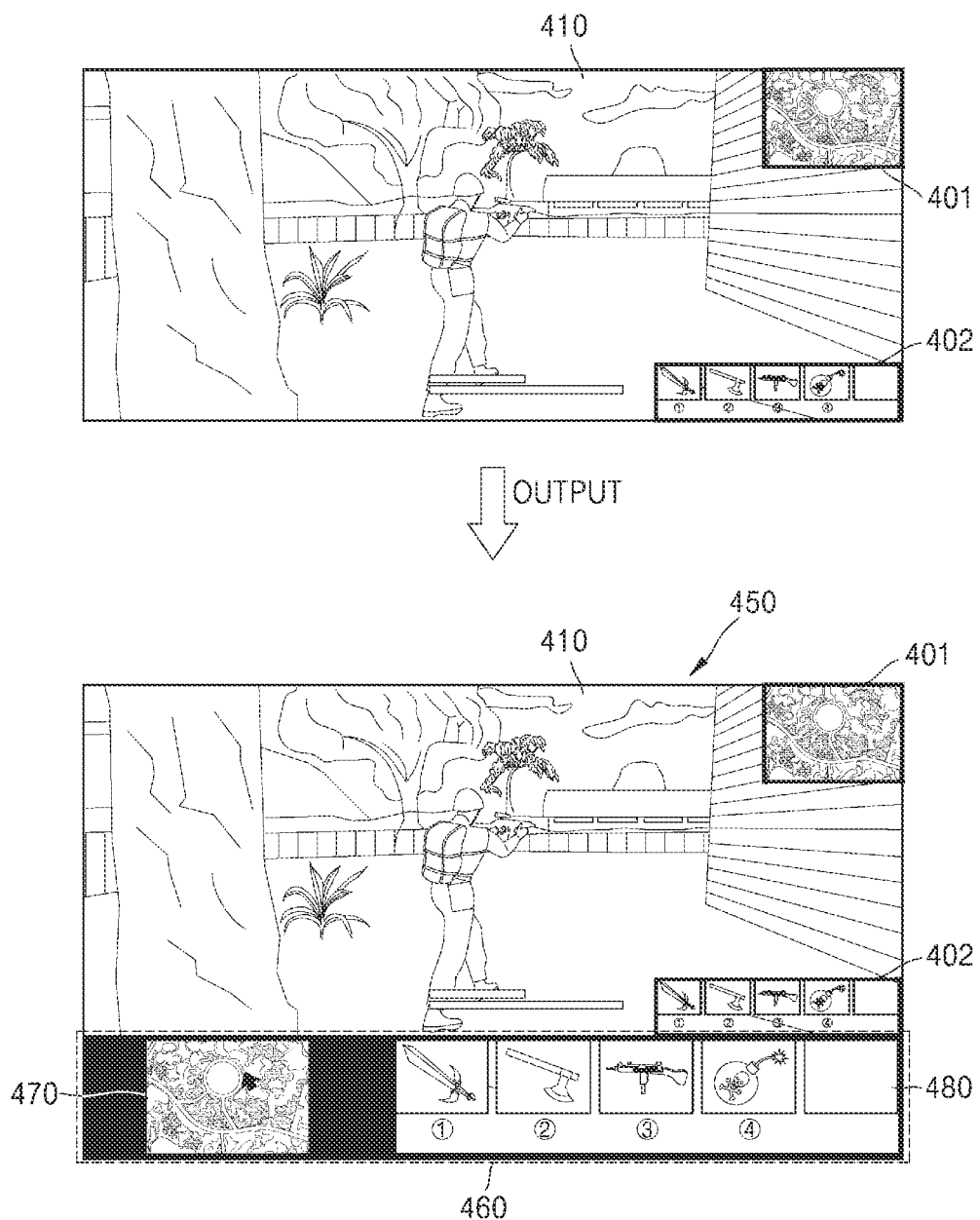
FIG. 4 is a diagram illustrating a full screen including a game image output on a display device and having an aspect ratio of 21:9 according to various embodiments.

FIG. 4 is a diagram illustrating an example full screen including a game image output on a display device and having an aspect ratio of 21:9 according to various embodiments. For example, FIG. 4 shows an example of an image 410 received by the display device, and a full screen 450 corresponding thereto. For example, images and full screens shown in FIGS. 4 to 7 are assumed as being received by and output on the display device 100 described above in relation to FIG. 1. For example, the images (e.g., game images) shown in FIGS. 4 to 7 are assumed as being generated by the source device 101 described above in relation to FIG. 1, and being transmitted to the display device 100.

Referring to FIG. 4, the display device 100 may receive game content from the source device 101. For example, the game content may be received in the form of a stream or packet including audio and/or video data. The stream or packet corresponding to the game content may include a plurality of images. Herein, the image may be an image to be displayed to reproduce the game content, e.g., a reproduction screen or a menu screen of the game content. For example, the image may have a form of an image frame, a frame, or a group of pictures (GOP).

In FIG. 4 and the following drawings referenced below, an example in which an image received by a display device according to an embodiment of the disclosure is an image corresponding to game content (hereinafter referred to as a 'game image') is shown and described by way of non-limiting example.

The game content provided by the source device 101 may be 3D game content. The 3D game refers to a game which may be played by a user in a 3D space (e.g., a virtual space capable of implementing a three-dimensional environment). For example, the user who plays the 3D game may play, race, battle, fight, or war against virtual characters at a certain site in the 3D space. As another example, in addition to the 3D game content for playing the game in the 3D space, the game content may also include 2D game content for playing a general game in a two-dimensional (2D) space.

In the above-described 3D game or general game, the game image may include at least one sub-window. For example, the sub-window may be displayed in a partial area on a game reproduction screen, and include a minimap, a skill window, an item window, a character window, a chat window, or a control window to provide information related to the progress of the game or a service for game participants (e.g., a chat service). The type of the sub-window included in the game image may vary depending on the type of the game.

For example, the minimap may be an image for displaying a small-scale map of the space where the game is played. The skill window may be a status window indicating a skill and a cool-down time of the skill. The item window may be a window for providing information about items used for the game. For example, the item window may include an item inventory window. The item inventory window may display types and/or reuse times of items owned by the user. The character window may be a window for providing information about a character used to play the game. For example, the character window may include a character status window. In a game played between allies and enemies, e.g., a battle game, the character status window may be a window indicating health points (HP) and/or mana point (MPs), respawn times, etc. of the allies and/or the enemies. The chat window may be a window for displaying a chat between a plurality of users who play or watch the game. Alternatively, the chat window may be a window for displaying a message related to the game.

For example, in a game in which the user controls or drives an object used for the game (e.g., an aircraft or an automobile), the control window may be a window for providing information related to a cockpit. For example, the control window may include a flight simulation cockpit window for providing information required or used for flight or operation. The flight simulation cockpit window may display an airspeed, an engine condition, fuel, flaps, trims, an altitude, etc.

The above-described sub-window may be separately defined and/or displayed on the game image. Instead of being separately defined, the sub-window may be opaquely or translucently displayed on a partial area of the game image.

Referring to the example of FIG. 4, a minimap 401 and an item window 402 may be displayed on a game image 410 having an aspect ratio of 21:9. In the example of FIG. 4, two sub-windows such as the minimap 401 and the item window 402 are displayed in the game image 410.

For example, a partial area included in the game image 410 and to be enlarged may include the above-described sub-window. As another example, the partial area included in the game image 410 and to be enlarged separately from the game image 410 may include an area where a moving object is displayed in the game image 410.

For example, to enlarge the sub-window included in the game image 410 (e.g., the minimap 401 or the item window 402), the display device 100 may display a full screen including the game image 410 and an enlarged image corresponding to the sub-window.

For example, the sub-window may provide information useful to the user who plays the game. For example, the game user may view the provided minimap and move an object corresponding to the game user to a position that is advantageous to win the game.

The sub-window (e.g., a chat window) may support the exchange of opinions or information between users who play or watch the game. As such, convenience of the game user may be increased.

The sub-window may provide information about the progress of the game and the victory/defeat or a winning rate of the game.

The sub-window may provide an additional service related to the game. For example, the sub-window may provide a separate service related to the game (e.g., a link to a shopping mall related to the game or a link to a broadcast program related to the game).

As described above, the sub-window may provide information useful or helpful to the game user, and increase convenience of the game user. Therefore, when the sub-window is enlarged compared to that displayed in the game image, user convenience may be further increased. As such, in an embodiment of the disclosure, a full screen output on the display device 100 may include an enlarged image corresponding to the sub-window separately from the game image, and a detailed description thereof is provided with reference to FIG. 4.

Referring to the example of FIG. 4, when a physical aspect ratio of a display of the display device 100 is 16:9 as in FIG. 3, the full screen 450 has an aspect ratio of 16:9. When the game image 410 having an aspect ratio of 21:9 is displayed on the full screen 450, a black area 460 may occur. The display device 100 may display an enlarged image corresponding to the sub-window, on an area other than the area where the game image 410 is displayed on the full screen 450, e.g., the black area 460. For example, the enlarged image may be an image displayed by enlarging a partial area included in the game image 410 (e.g., an area displayed as the sub-window). Alternatively, the enlarged image may be an image displayed by enlarging at least one image object included in a partial area included in the game image 410 (e.g., an area displayed as the sub-window).

For example, the full screen 450 may include the game image 410 having an aspect ratio of 21:9, an enlarged image 470 corresponding to the minimap 401 included as a sub-window in the game image 410, and an enlarged image 480 corresponding to the item window 402 included as another sub-window in the game image 410. Herein, the enlarged images 470 and 480 may be displayed on the black area 460.

After the full screen 450 is displayed, the game image 410 may be received in a changed aspect ratio. Because the display device 100 supports output in a plurality of aspect ratios, the display device 100 may receive the image having the changed aspect ratio, decode the received image, and display a full screen corresponding to the decoded image.

In this example, an enlarged image display error may occur. The enlarged image display error is now described in greater detail below with reference to FIG. 5.

Figure 5:
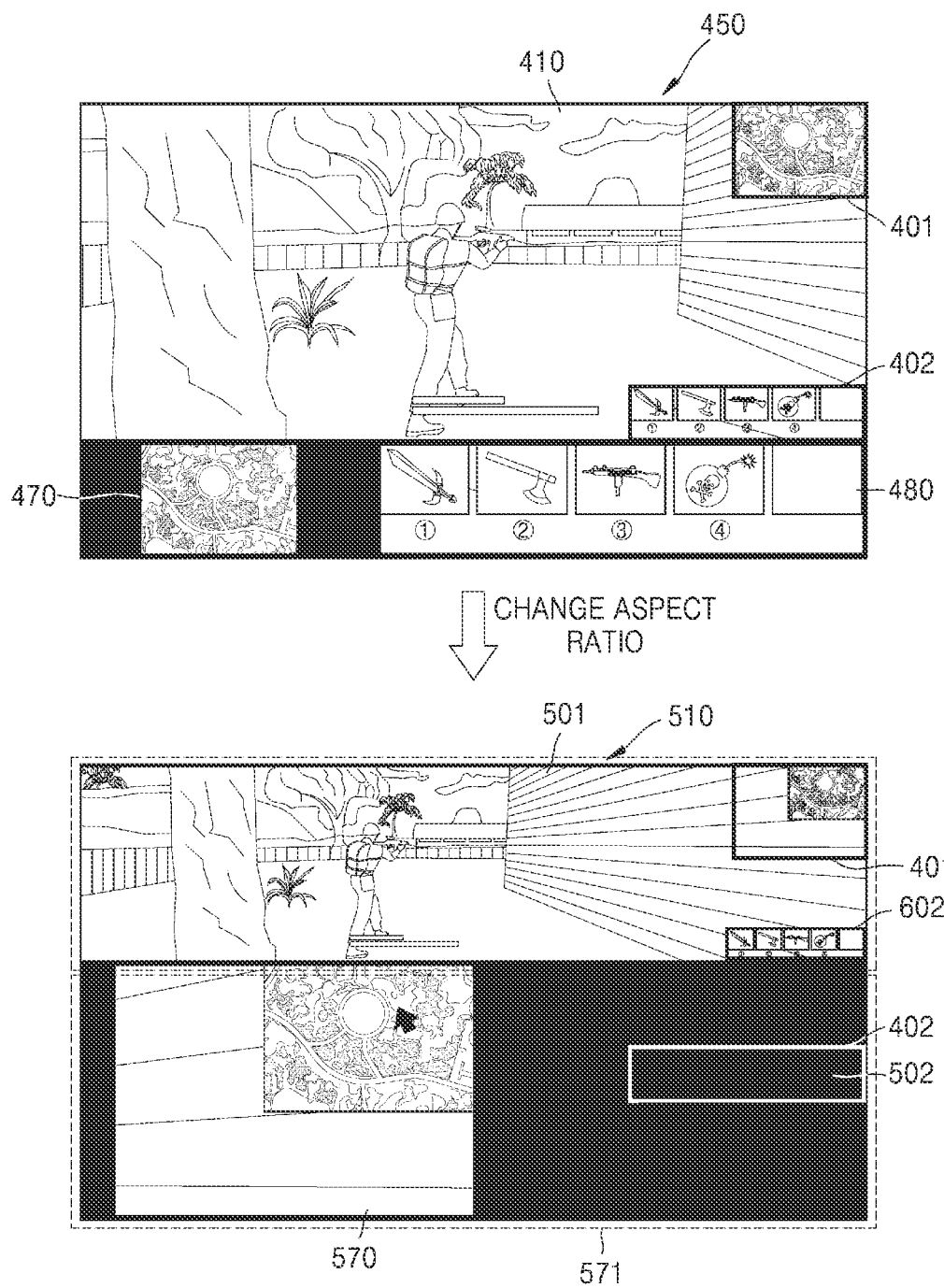
FIG. 5 is a diagram illustrating a change of a full screen based on a change of an aspect ratio of a game image from 21:9 to 32:9 according to various embodiments.

FIG. 5 is a diagram illustrating an example change of a full screen based on a change of an aspect ratio of a game image from 21:9 to 32:9 according to various embodiments. In FIG. 5, the same configurations as those of FIG. 4 are denoted by the same reference numerals. Thus, a repeated description thereof may not be provided herein.

Referring to FIG. 5, after the game image 410 having an aspect ratio of 21:9 is received, the aspect ratio of the game image 410 may be changed to 32:9 and a game image 501 having the changed aspect ratio may be received. The display device 100 may display a full screen 510 including the game image 501 having the changed aspect ratio of 32:9.

When an aspect ratio of an image corresponding to reproduced content is changed as described above, an existing or general display device does not change the position and size of a sub-window set in the image received before the aspect ratio is changed. As such, a partial area corresponding to the position and size of the sub-window set before the aspect ratio is changed is obtained on the image having the changed aspect ratio, and an enlarged image is generated by enlarging the obtained partial area. Therefore, a full screen including the image having the changed aspect ratio includes a wrong enlarged image. A detailed description thereof is now provided with reference to the full screen 510 shown in FIG. 5.

In the existing or general display device, although an aspect ratio of a game image is changed, the positions and sizes of the two sub-windows 401 and 402 set in the game image 410 having an aspect ratio of 21:9 and received before the aspect ratio is changed are constantly maintained. Referring to FIG. 5, when an aspect ratio is changed while game content is being reproduced, an output screen of the display device 100 may be switched from the full screen 450 to the full screen 510.

After the aspect ratio is changed, an enlarged image 570 included in the full screen 510 is displayed by enlarging a partial image displayed in a partial area having the same position and size as the previously set sub-window 401. The previously set sub-window 402 does not have a position and size corresponding to the game image 501 having an aspect ratio of 32:9, and is positioned in a black area 571. Therefore, a partial image corresponding to the previously set sub-window 402 is a black image, and an enlarged image corresponding to the sub-window 402 is displayed as a black image 502 on the black area 571.

As described above in relation to FIG. 5, in the general or existing display device, although an aspect ratio of a received image (e.g., game image) is changed while content is being reproduced, the position and size of a sub-window corresponding to an enlarged image are not changed. As such, the enlarged image provided to a user is displayed as a wrong image like the enlarged image 570 or 502 described above in relation to FIG. 5. Specifically, an enlarged image of a wrong image object is displayed instead of an enlarged image that the user wants to be provided with, and thus the user may experience inconvenience during the game. That is, user convenience and satisfaction may be reduced by displaying the wrong enlarged image.

In the following description, full screens output when an aspect ratio of a displayed game image is changed from 32:9 to 21:9 while game content is being reproduced are described in greater detail below with reference to FIGS. 6 and 7.

Figure 6:
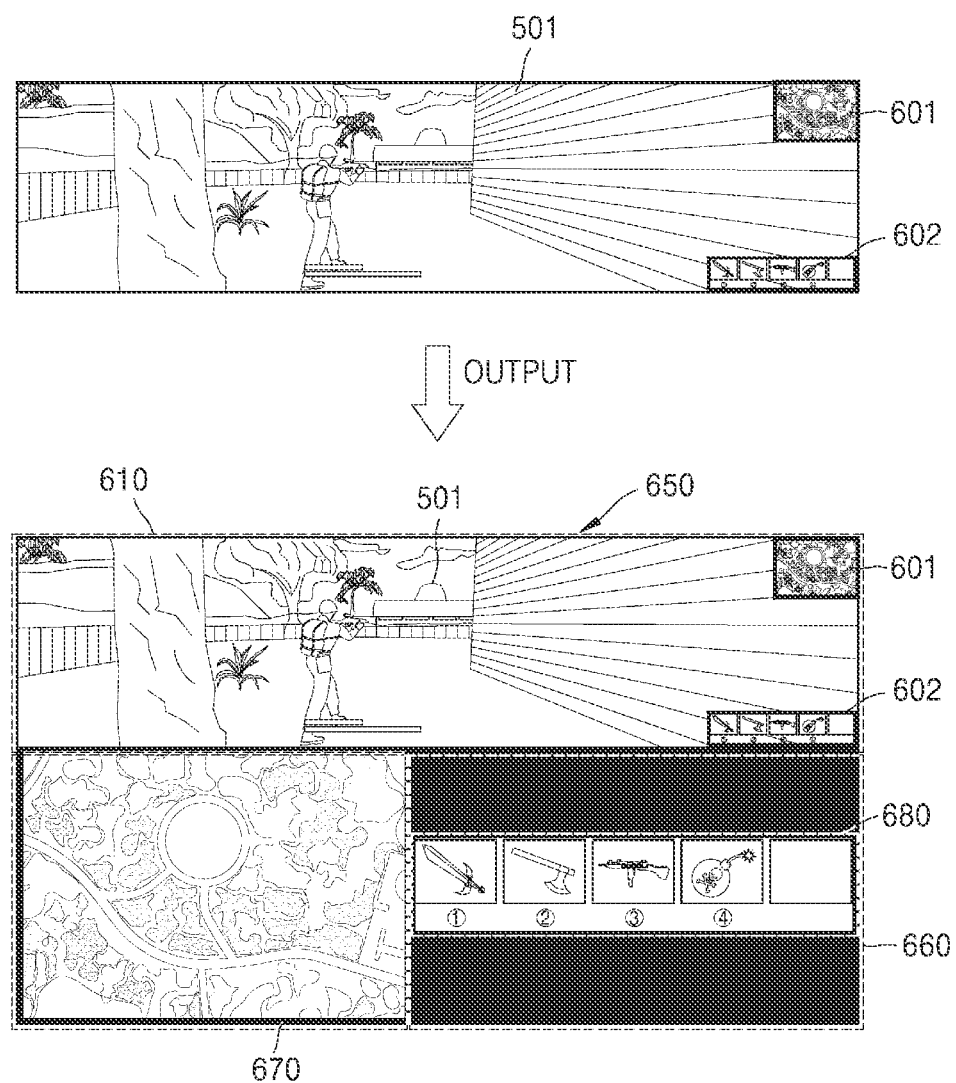
FIG. 6 is a diagram illustrating a full screen including a game image output on a display device and having an aspect ratio of 32:9 according to various embodiments.

FIG. 6 is a diagram illustrating an example full screen including a game image output on a display device and having an aspect ratio of 32:9 according to various embodiments. In FIG. 6, the same or similar configurations as those of FIG. 5 are denoted by the same reference numerals, and thus a repeated description thereof may not be provided herein.

Referring to FIG. 6, when the game image 501 having an aspect ratio of 32:9 is received, the display device 100 may display a full screen 650 corresponding to the received game image 501.

As described above in relation to FIG. 4, the game image 501 may include a minimap 601 and an item window 602 as sub-windows.

For example, the full screen 650 may include the game image 501 having an aspect ratio of 32:9, an enlarged image 670 corresponding to the minimap 601 included as a sub-window in the game image 501, and an enlarged image 680 corresponding to the item window 602 included as another sub-window in the game image 501. Herein, the enlarged images 670 and 680 may be displayed on a black area 660. The black area 660 may be an area other than an area 610 where the game image 501 is displayed on the full screen 650.

Figure 7:
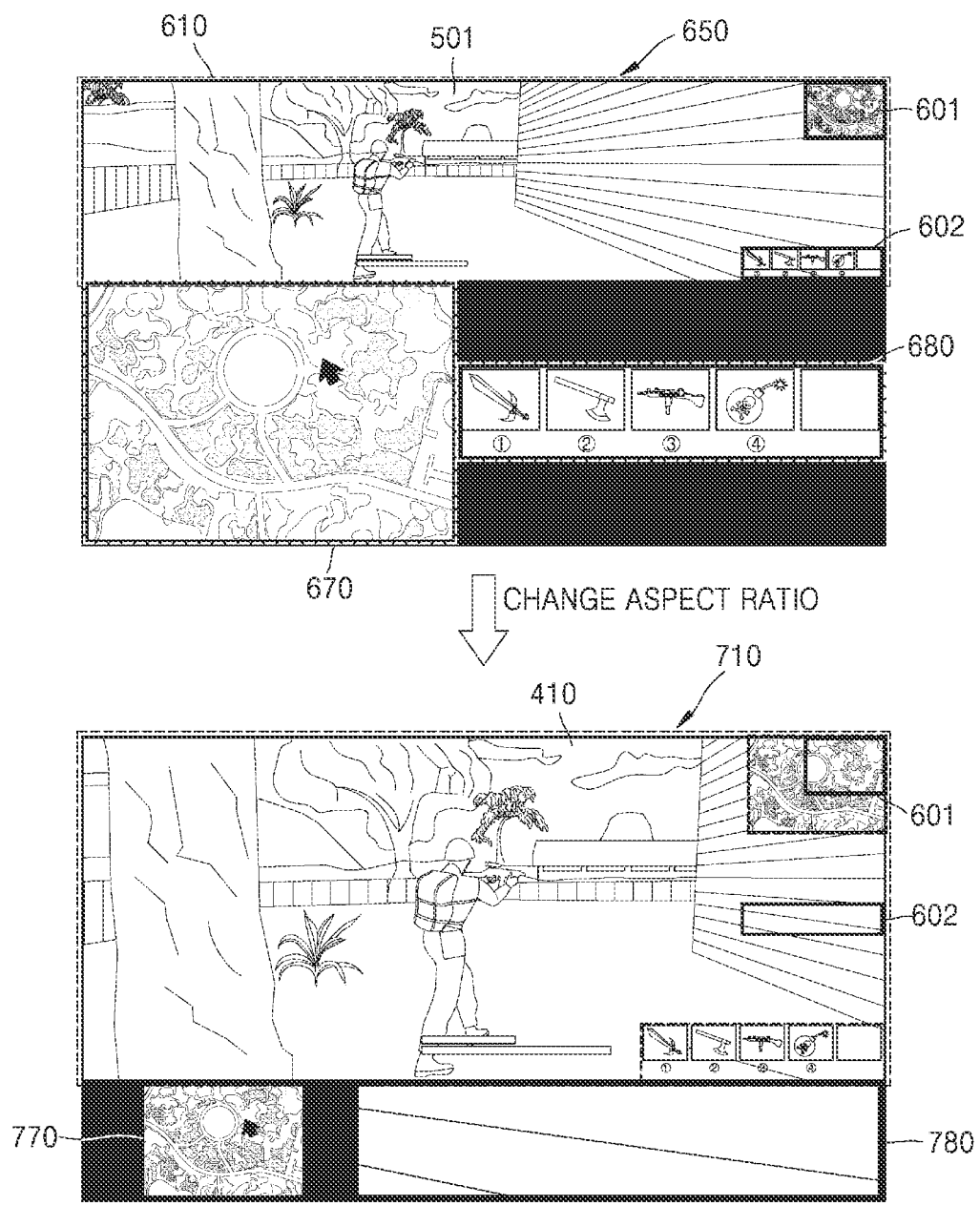
FIG. 7 is a diagram illustrating a change of a full screen based on a change of an aspect ratio of a game image from 32:9 to 21:9 according to various embodiments.

FIG. 7 is a diagram illustrating an example change of a full screen based on a change of an aspect ratio of a game image from 32:9 to 21:9 according to various embodiments. In FIG. 7, the same or similar configurations as those of FIGS. 4 and 6 are denoted by the same reference numerals, and thus a repeated description thereof may not be provided herein.

Referring to FIG. 7, after the full screen 650 is displayed, the aspect ratio of the game image 501 may be changed from 32:9 to 21:9. Because the display device 100 supports output in a plurality of aspect ratios, the display device 100 may receive the game image 410 having the changed aspect ratio of 21:9, decode the received game image 410, and display a full screen 710 corresponding to the decoded game image 410.

In this case, an enlarged image display error may occur equally or similarly to that described above in relation to FIG. 5. The enlarged image display error is now described in detail with reference to FIG. 7.

In an existing or general display device, although an aspect ratio of a game image is changed, the positions and sizes of the two sub-windows 601 and 602 set in the game image 501 having an aspect ratio of 32:9 and received before the aspect ratio is changed are constantly maintained. Referring to FIG. 7, when an aspect ratio is changed while game content is being reproduced, an output screen of the display device 100 may be switched from the full screen 650 to the full screen 710.

After the aspect ratio is changed, an enlarged image 770 included in the full screen 710 is displayed by enlarging a partial image displayed in a partial area having the same position and size as the previously set sub-window 601. The previously set sub-window 602 is not an area where items are displayed in the game image 410 having an aspect ratio of 21:9, and may be an area where an outer wall of a building is displayed instead of information meaningful to a game user. Therefore, because a partial image corresponding to the previously set sub-window 602 is an image showing the outer wall of the building, an enlarged image 780 corresponding to the sub-window 602 may be displayed as shown in FIG. 7.

As described above in relation to FIG. 7, in the general or existing display device, although an aspect ratio of a received image (e.g., game image) is changed while content is being reproduced, the position and size of a sub-window corresponding to an enlarged image are not changed.

As such, the enlarged image provided to the user is displayed as a wrong image like the enlarged image 770 or 780 described above in relation to FIG. 7. For example, an enlarged image of a wrong image object is displayed instead of an enlarged image that the user wants to be provided with, and thus the user may experience inconvenience during the game. That is, user convenience and satisfaction may be reduced by displaying the wrong enlarged image.

Embodiments of the disclosure relate to a method and apparatus capable of preventing/reducing an enlarged image display error caused when an aspect ratio of an image corresponding to reproduced content is changed as described above in relation to FIGS. 5 and 7, and a description thereof is now provided in greater detail below with reference to FIGS. 8 to 25.

Figure 8:
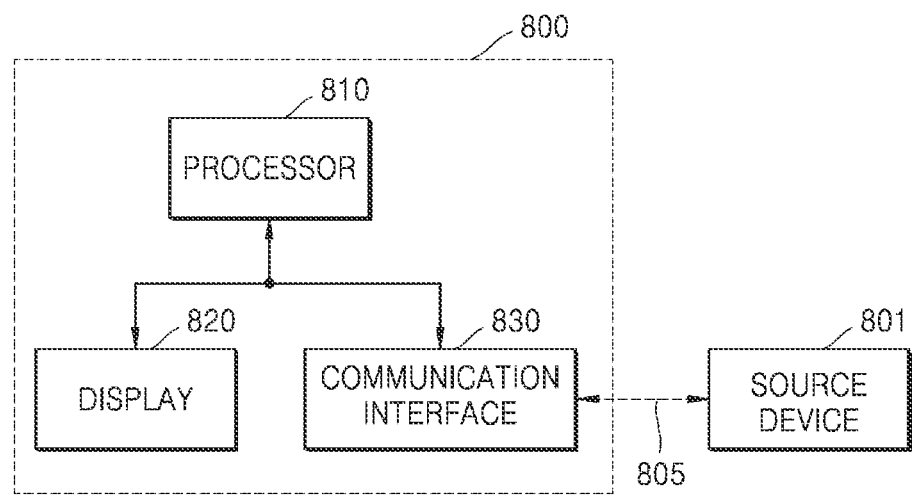
FIG. 8 is a block diagram illustrating an example configuration of a display device according to various embodiments.

FIG. 8 is a block diagram illustrating an example configuration of a display device according to various embodiments. A display device 800 and a source device 801 illustrated in FIG. 8 may correspond to the display device 100 and the source device 101 illustrated in FIG. 1, respectively. Therefore, a description repeated from FIGS. 1 to 7 is not provided herein to describe the display device 800.

Referring to FIG. 8, the display device 800 includes a display 820, a communication interface (e.g., including communication circuitry) 830 configured to communicate with the source device 801, and a processor (e.g., including processing circuitry) 810 configured to execute at least one instruction.

The processor 810 included in the display device 800 according to an embodiment of the disclosure may include various processing circuitry and execute the at least one instruction to control one or more elements included in the display device 800 to perform the following operations. For example, the processor 810 receives, from the source device 801, a first image corresponding to a first aspect ratio, and generates and displays a first full screen including the first image and a first enlarged image corresponding to a first partial area to be enlarged, based on identification of the first partial area in the first image. The processor 810 identifies a second partial area corresponding to the first partial area, in a second image corresponding to a second aspect ratio different from the first aspect ratio, based on the first and second aspect ratios when the second image is received from the source device 801. The processor 810 generates and displays a second full screen including the second image and a second enlarged image corresponding to the identified second partial area.

For example, the 'first image' may be an image corresponding to content being reproduced on the display device 800. Herein, the content may be game content, lecture content, cinema content, music content, home training service content, or other broadcast content (e.g., news, a drama, or a music program). In the following description, a case in which the content being reproduced by the display device 800 is game content and the first and second images are game images corresponding to a reproduction screen, a menu screen, an execution screen, or the like of the game content is shown and described as an example.

A 'partial area' may refer to a local area included in an image, and may correspond to a 'sub-window' described above in relation to FIGS. 4 to 7. For example, in an embodiment of the disclosure, the 'partial area' (e.g., the 'first partial area' or the 'second partial area') may refer to a local area in a game image, which includes an image object that a game user wants to enlarge.

For example, the partial area included in an image corresponding to the content (e.g., the game image) and to be enlarged may be an area where at least one image object corresponding to at least one of a minimap, at least one moving object, an item window, a character window, a chat window, or a current status information window is displayed. For example, the processor 810 may identify, as the first partial area, an area where at least one of at least one moving object, a minimap, an item window, a character window, a chat window, or a current status information window included in the first image is displayed, and obtain the first enlarged image corresponding to the first partial area.

The first and second aspect ratios may have different values. Each of the first and second aspect ratios may be the same as or correspond to one of a plurality of aspect ratios supported by the display device 800.

The second image may be output and transmitted from the source device 801 based on a user request. For example, the display device 800 may control the source device 801 to transmit the second image having the second aspect ratio, based on a user input received while the first image having the first aspect ratio is being received from the source device 801.

The processor 810 executes the at least one instruction to provide control to perform an intended operation. Herein, the at least one instruction may be stored in an internal memory (not shown) included in the processor 810, or a memory (not shown) included in the display device 800 separately from the processor 810.

For example, the processor 810 may execute the at least one instruction to control one or more elements included in the display device 800 to perform an intended operation. Therefore, although it is described that the processor 810 performs certain operations, it may refer, for example, to the processor 810 controlling one or more elements included in the display device 800 to perform the certain operations.

Although the processor 810 is described and illustrated as a single processor, the processor 810 may include a plurality of processors.

For example, the processor 810 may include random access memory (RAM) (not shown) for storing signals or data input from outside the display device 800, or used as a storage space corresponding to various operations performed in the display device 800, read-only memory (ROM) (not shown) for storing control programs for controlling the display device 100, applications for providing certain functions or services, and/or a plurality of instructions, and at least one processor (not shown). The processor (not shown) may include a graphics processing unit (GPU) (not shown) for processing graphics corresponding to video. The processor (not shown) may be implemented as a system on chip (SoC) in which a core (not shown) and the GPU (not shown) are integrated. The processor 810 may include multiple cores more than a single core. For example, the processor 810 may include dual cores, triple cores, quad-cores, hexa-cores, octa-cores, deca-cores, dodeca-cores, or hexadecimal cores.

The display 820 outputs an image on a screen. For example, the display 820 may output an image corresponding to video data, through a display panel (not shown) included therein, such that a user may visually recognize the video data. Specifically, video data configuring the content may include a plurality of frame images, and the display 820 may reproduce the video content by sequentially displaying the plurality of frame images under the control of the processor 810.

In an embodiment of the disclosure, the display 820 may display, on the screen under the control of the processor 810, an image corresponding to the content (e.g., the game image) received from the source device 101.

The communication interface 830 may include various communication circuitry and communicate with at least one external device (e.g., the source device 101) through a wired or wireless communication network. Herein, the external device (not shown) may be the source device 801, a server device, a storage device, or the like capable of providing content.

For example, to communicate with the external device (e.g., the source device 101) in a wired manner, the communication interface 830 may include at least one port (not shown) to be connected to the external device through a wired cable. For example, the communication interface 830 may include at least one of a high-definition multimedia interface (HDMI) port, a component jack, a PC port, or a universal serial bus (USB) port. As such, the communication interface 830 may communicate with the external device connected through the at least one port (not shown) in a wired manner.

The communication interface 830 may include at least one wireless communication module, wireless communication circuit, or wireless communication device for communicating with the external device, e.g., the source device 801, in a wireless manner.

For example, the communication interface 830 may include at least one communication module (not shown) for performing communication according to a communication standard such as Bluetooth, Wi-Fi, BLE, NFC/RFID, Wi-Fi direct, UWB, or Zigbee. The communication interface 830 may further include a server (not shown) for supporting telecommunication according to a telecommunication standard, and a communication module (not shown) for performing communication. For example, the communication interface 830 may include a communication module (not shown) for performing communication through a network for Internet communication. In addition, the communication interface 830 a communication module (not shown) for performing communication through a communication network according to a communication standard such as 3G, 4G, 5G, and/or 6G.

In an embodiment of the disclosure, in order for the display device 800 to provide the content transmitted from the source device 801 to the user, the processor 810 may include an application for providing the received content. For example, when the content is the game content, the processor 810 may include a game application for controlling and/or managing execution of the received game content. For example, the game application may be implemented as at least one instruction or program for controlling execution of the game content.

In FIGS. 9 to 25 to be referred below, a case in which an image received by the display device 800 from the source device 801 is a game image corresponding to game content is shown and described as an example. A case in which the display device 800 includes an HDMI port and is connected to and communicates with the source device 801 in a wired manner through a HMDI cable connected to the HDMI port is described as an example.

The display device 800 may support output of screens having various resolutions and/or aspect ratios. For example, the display device 800 may output, on the display 820 including a display panel having a certain aspect ratio, screens including images having aspect ratios such as 4:3, 16:9, 16:10, 21:9, and/or 32:9. The size and aspect ratio of the display 820 (specifically, the size and aspect ratio of the display panel) may correspond to the size and aspect ratio of a screen output through the display 820. The screen output through the display 820 may include images having various aspect ratios. A physical size or aspect ratio of the display 820 may be referred to as a 'display aspect ratio' or a 'full screen aspect ratio', and an aspect ratio of an image corresponding to content may be referred to as 'an aspect ratio of the image'.

Figure 9:
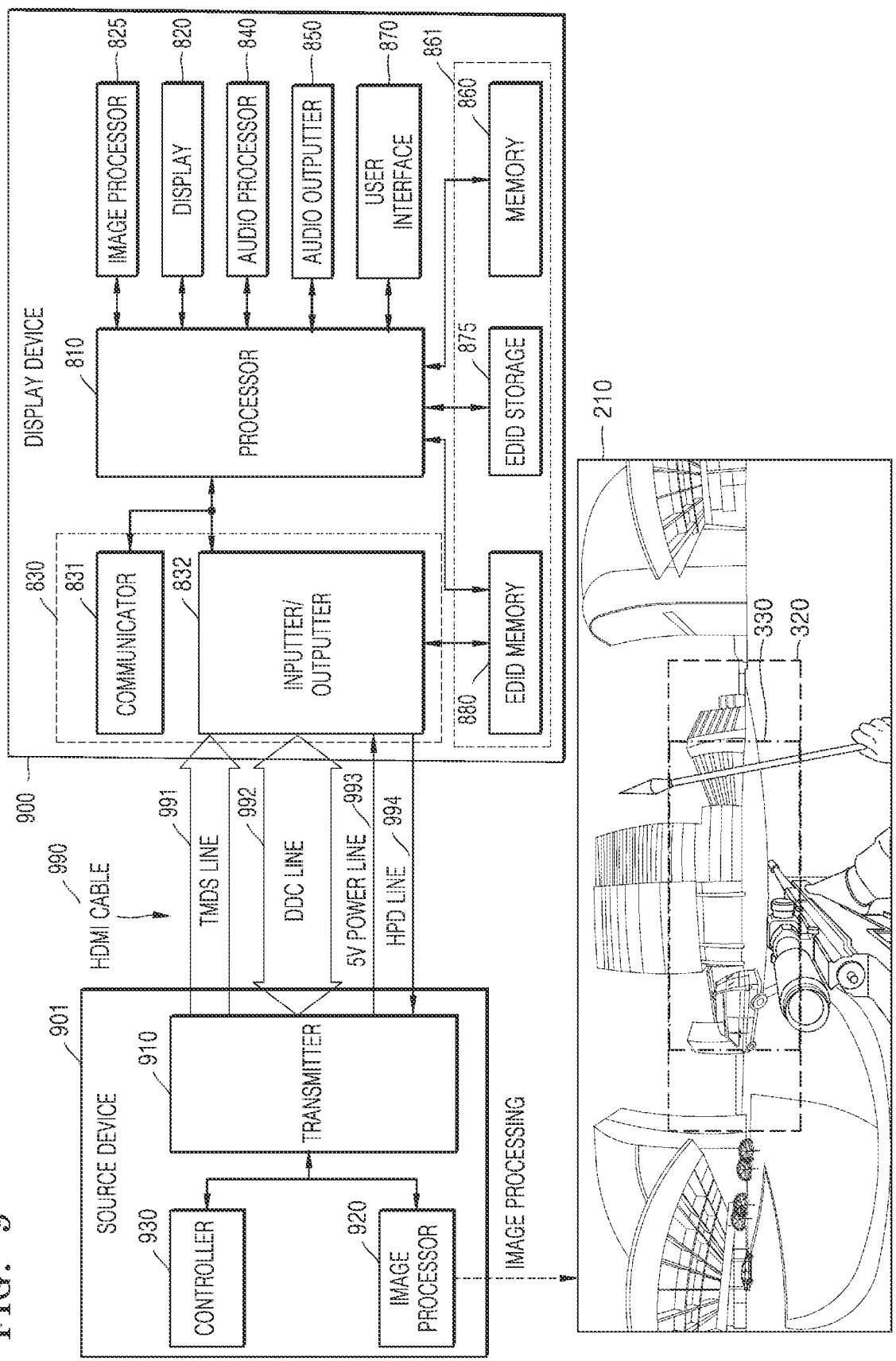
FIG. 9 is a block diagram illustrating an example configuration of a display device according to various embodiments.

FIG. 9 is a block diagram illustrating an example configuration of a display device according to various embodiments. In FIG. 9, the same or similar configurations as those of FIGS. 3 and 8 are denoted by the same reference numerals. A display device 900 and a source device 901 illustrated in FIG. 9 may correspond to the display device 100 and the source device 101 illustrated in FIG. 1, respectively. The display device 900 and the source device 901 illustrated in FIG. 9 may also correspond to the display device 800 and the source device 801 illustrated in FIG. 8, respectively. Therefore, a description repeated from FIGS. 1 to 8 is not provided herein to describe the display device 900.

Initially, the source device 901 is now described. Referring to FIG. 9, the source device 901 may include a transmitter 910, an image processor (e.g., including image processing circuitry) 920, and a controller (e.g., including various processing and/or control circuitry) 930.

The transmitter 910 may output an image signal of a resolution processable by the display device 900, and an audio signal of a sound format processable by the display device 900. For example, the image signal may be a digital image signal formed as a digital signal. The transmitter 910 may read EDID from the display device 900 under the control of the controller 930. Herein, the EDID may include display characteristic information including information about a resolution, a sound format, or the like supported by the display device 900. For example, the information about the resolution, which is included in the EDID, may be represented as information about a vertical pixel value and a horizontal pixel value of a screen to be output on the screen of the display device 900. Therefore, the EDID may include information about an aspect ratio supported by the display device 900.

The transmitter 910 may include one or more ports to communicate with the display device 900. For example, the one or more ports may include ports according to various standards, e.g., a high-definition multimedia interface (HDMI) port, a display port (DP), a Thunderbolt port, a mobile high-definition link (MHL) port, and a universal serial bus (USB) port.

The image processor 920 may include various image processing circuitry and process an image to be transmitted through the transmitter 910, under the control of the controller 930.

Similarly to the processor 810, the controller 930 may include various processing and/or control circuitry and executes at least one instruction to provide control to perform an intended operation. For example, the controller 930 controls overall operation of the source device 901, and may provide control to process image and audio signals to be transmitted to the display device 900, and provide control to transmit the processed image and audio signals through the transmitter 910 to the display device 900.

The controller 930 may read, from the display device 900, the EDID including the display characteristic information, and control the image processor 920 to process an image, based on the read EDID. The image processing and transmission operation based on the EDID will be described in detail below.

The display device 900 is now described. Referring to FIG. 9, compared to the display device 800 illustrated in FIG. 8, the display device 900 may further include at least one of an image processor (e.g., including image processing circuitry) 825, an audio processor (e.g., including audio processing circuitry) 840, an audio outputter (e.g., including audio output circuitry) 850, a storage (e.g., including at least one memory) 861, and/or a user interface (e.g., including user interface circuitry) 870.

The communication interface 830 may include various communication circuitry and receive the image and audio signals from the source device 901 according to a connected protocol and output the image and audio signals to the image processor 825 and the audio processor 840 under the control of the processor 810.

The communication interface 830 may include at least one of at least one communication module or at least one port for transmitting or receiving data to or from an external device (not shown). Specifically, the communication interface 830 may include a communicator 831 and an inputter/outputter 832.

The communicator 831 may include various communication circuitry and communicates with the external device through at least one wired or wireless communication network. In an embodiment of the disclosure, the communicator 831 may communicate with the source device 901. For example, the communicator 831 may be provided in a form including at least one communication module or communication circuit, and transmit or receive data to or from the external device through the communication module and/or the communication circuit.

For example, the communicator 831 may include at least one communication module (not shown) for performing communication according to a communication standard such as Bluetooth, Wi-Fi, BLE, NFC/RFID, Wi-Fi direct, UWB, or Zigbee. The communicator 831 may include a communication module (not shown) for performing communication through a network for Internet communication. The communicator 831 may include a communication network according to a communication standard such as 3G, 4G, 5G, and/or 6G.

The communicator 831 may include a communication module capable of receiving a control command from a remote controller (not shown) located nearby, e.g., an infrared (IR) communication module. In this case, the communicator 831 may receive a control command from the remote controller (not shown). For example, the control command received from the remote controller (not shown) may include a turn on or off command or a signal for requesting to execute a home training application.

As another example, the control command received from the remote controller (not shown) may include a control command related to reproduction of a game. For example, the control command may include a command for requesting to change an aspect ratio of a game image, or a control command based on a user input for setting a sub-window (or an area to be enlarged) in the game image.

The inputter/outputter 832 may include various input/output circuitry including an HDMI port, (not shown), a component jack (not shown), a PC port (not shown), or a USB port (not shown). The inputter/outputter 832 may include a combination of an HDMI port, a component jack, a PC port, and a USB port. In this case, the inputter/outputter 832 may receive video data to be reproduced on the display device 900, directly through the HDMI port, the component jack, the PC port, or the USB port.

The image processor 825 may include various image processing circuitry and process the image signal received from the communication interface 830 and output the processed image signal to the display 820 under the control of the processor 810. Herein, the image signal may include video and/or audio data.

The display 820 may display, on a screen, the image signal received from the image processor 825. For example, the display 820 may display an image (e.g., a game image) generated based on the image signal received from the communication interface 830. As another example, the display 820 may display a full screen including a game image generated based on the image signal received from the communication interface 830, and at least one enlarged image corresponding to at least one partial area included in the game image.

The audio processor 840 may include various audio processing circuitry and convert the audio signal received from the communication interface 830 into an analog audio signal and output the analog audio signal to the audio outputter 850 under the control of the processor 810.

The audio outputter 850 may include various audio output circuitry and output the received analog audio signal through a speaker.

The storage 861 may include at least one memory and store programs related to operation of the display device 900, and various types of data generated during operation of the display device 900. Alternatively, the storage 861 may store content received from the source device 901. Alternatively, the storage 861 may store data or information required for operation of the display device 900.

The storage 861 may include one or more memories 860, 875, and 880. Herein, the one or more memories 860, 875, and 880 may include at least one of flash memory, a hard disk, a multimedia card micro, a memory card (e.g., a secure digital (SD) or extreme digital (XD) memory card), random access memory (RAM), static random access memory (SRAM), read-only memory (ROM), electrically erasable programmable read-only memory (EEPROM), programmable read-only memory (PROM), magnetic memory, a magnetic disc, or an optical disc.

Although a case in which the storage 861 includes three storage elements 860, 875, and 880 is shown as an example in FIG. 9, the storage 861 may include one, or four or more storage elements. For example, the storage 861 may include a memory 860. Alternatively, the storage 861 may include at least one of a memory 860, an EDID storage 875, or an EDID memory 880.

The memory 860 may store programs related to operation of the display device 900, and various types of data generated during operation of the display device 900.

The EDID storage 875 is a memory storing EDID, and may store EDID including a manufacturer/product identifier of the display device 900, an EDID format version, or display characteristic information such as a display parameter (e.g., a supported resolution or color format) or an audio format. The EDID may be stored in the EDID storage 875 by the manufacturer in a production process of the display device 900. For example, the EDID storage 875 may use flash memory.

The EDID storage 875 may store EDID corresponding to each of the one or more ports included in the communication interface 830 of the display device 900. For example, when the communication interface 830 includes an HDMI port and a display port, the EDID storage 875 may store EDID used for the HDMI port and EDID used for the display port.

For example, the processor 810 may record the EDID stored in the EDID storage 875, on the EDID memory 880 such that the EDID may be read by the source device 901. For example, the EDID memory 880 from which the source device 901 may read the EDID may be implemented as EEPROM.

For example, the processor 810 may not record the EDID stored in the EDID storage 875, equally on the EDID memory 880, but change the EDID to correspond to the content received from the source device 901, and record the changed EDID on the EDID memory 880. Herein, when the EDID is changed, it may refer, for example, to at least some of information included in the EDID being deleted, modified, reset, updated, and/or added. The EDID stored in a manufacturing process of the display device 900 may be referred to as EDID or original EDID in order to be distinguished from the changed EDID, and the EDID changed by the processor 810 may be referred to as changed EDID.

For example, the processor 810 may change the original EDID and store the changed EDID in the EDID memory 880 whenever necessary to increase EDID compatibility.

In an embodiment of the disclosure, a plurality of pieces of EDID may be stored in the EDID storage 875 when the display device 900 is manufactured. For example, the plurality of pieces of EDID stored when the display device 900 is manufactured may include original EDID including display characteristic information for implementing optimal performance of the display device 900, and one or more pieces of changed EDID including display characteristic information changed for EDID compatibility. When the plurality of pieces of EDID are stored in the EDID storage 875 as described above, the processor 810 may merely select suitable EDID and record the selected EDID on the EDID memory 880 without changing the EDID when the display device 900 operates, and thus the load of the processor 810 may be reduced.

The user interface 870 may include various user interface circuitry and receive a user input for controlling the display device 900. The user interface 870 may include a user input device including a touch panel for sensing touch of a user, buttons for receiving push manipulation of the user, a wheel for receiving rotation manipulation of the user, a keyboard, a switch dome, or the like, but is not limited thereto.

The user interface 870 may include a voice recognizer (not shown) for recognizing voice. For example, the voice recognizer may be a microphone, and receive a voice command or a voice request of the user. As such, the processor 810 may provide control to perform an operation corresponding to the voice command or the voice request. Herein, the voice command or the voice request may be referred to as a 'voice user input'.

The user interface 870 may include a motion sensor (not shown). For example, the motion sensor (not shown) may detect motion of the display device 900, and receive the detected motion as a user input. The voice recognizer (not shown) and the motion sensor (not shown) described above may not be included in the user interface 870 but be included in the display device 900 as modules independent of the user interface 870.

In the following description, the operation of the display device 900 to receive the image signal from the source device 901 is described in detail. For example, the processor 810 may process the image and audio signals transmitted from the source device 901, and provide control to display the image signal on the display 820 and output the audio signal through the audio outputter 850.

For example, the transmitter 910 of the source device 901 may be connected to the communication interface 830 (e.g., the inputter/outputter 832) of the display device 900 through one or more cables.

In FIG. 9, a case in which the transmitter 910 is connected to the communication interface 830 through an HDMI cable 990 is shown and described as an example.

In an embodiment of the disclosure, the controller 930 of the source device 901 may read EDID from the display device 900 when the source device 901 is connected to the display device 900, control the image processor 920 to process an image signal based on the read EDID, and control the transmitter 910 to transmit the processed image signal to the display device 900.

Referring to FIG. 9, the HDMI cable 990 may include a transition-minimized differential signaling (TMDS) line 991 for transmitting image and audio signals, a display data channel (DDC) line 992 for transmitting EDID, a 5V power line 993 for providing a 5V voltage from the source device 901 to the display device 900, and a hot plug detect (HPD) line 994 for controlling EDID reading.

When the source device 901 is connected to the display device 900 by the HDMI cable 990, the transmitter 910 of the source device 901 may provide a 5V voltage through the 5V power line 993 to the inputter/outputter 832 of the display device 900. The inputter/outputter 832 having received the 5V voltage may transmit a signal having a high-level voltage through the HPD line 994 to the transmitter 910 of the source device 901. The transmitter 910 of the source device 901 having received the signal having a high-level voltage through the HPD line 994 may send an EDID request signal through the DDC line 992, and the inputter/outputter 832 having received the EDID request signal may provide EDID of the display device 900 to the transmitter 910 of the source device 901 under the control of the processor 810.

The controller 930 of the source device 901 having received the EDID of the display device 900 may obtain display characteristic information by parsing the EDID and provide control to process content based on the obtained display characteristic information. For example, the controller 930 may provide control to generate an image (e.g., a game image) corresponding to the obtained display characteristic information. Subsequently, the transmitter 910 of the source device 901 may transmit the processed image and audio signals through the TMDS line 991 to the inputter/outputter 832.

The source device 901 may determine whether the voltage level of the HPD signal is a high level higher than or equal to a preset certain voltage level, and read the EDID from the display device 900 according to the inter-integrated circuit (I2C) bus protocol when the voltage level is a high level. Therefore, the display device 900 may control reading of the EDID thereof by the source device 901, by controlling the HPD line 994. Specifically, when the EDID is required to be changed, the display device 900 may prevent and/or reduce the source device 901 from reading the EDID signal by maintaining the HPD line 994 at a low level while the EDID is being changed, and control the source device 901 to read the changed EDID by switching the HPD line 994 to a high level after the EDID is completely changed.

For example, the display device 900 may perform the EDID change operation when at least one of a resolution or an aspect ratio of the image received from the source device 901 does not correspond to the EDID of the display device 900. In this case, the display device 900 may prevent and/or reduce the source device 901 from reading the EDID signal by maintaining the HPD line 994 at a low level while the EDID change operation is being performed, and control the source device 901 to read the changed EDID by switching the HPD line 994 to a high level after the EDID change operation is completely performed.

As described above, the display device 900 may provide the EDID thereof to the source device 901 to receive an image signal including an image corresponding to the set EDID. When the aspect ratio and/or the resolution of the image corresponding to the content provided from the source device 901 is changed, the display device 900 may perform the EDID change operation in response to the change of the aspect ratio and/or the resolution. When an aspect ratio of a game image corresponding to game content is changed as described above in relation to FIGS. 5 and 7, the EDID change operation may be performed as described above.

For example, when the content reproduced by the display device 900 is a game (e.g., a 3D game), the 3D game may use a 360° image to represent a 3D space or use a panorama image to represent a 360° space. Specifically, an image corresponding to a partial area corresponding to a FoV of the user on the 360° image 210 may be provided to the user, and the user may play the 3D game while viewing the provided image. For example, the controller 930 of the source device 901 may obtain the EDID of the display device 900, and control the image processor 920 to generate an image to be transmitted to the display device 900, based on aspect ratio information included in the obtained EDID (e.g., aspect ratio information of 32:9). As such, the image processor 920 may render an area corresponding to the FoV of the game user in the 360° image 210, based on the aspect ratio of 32:9. As such, the source device 901 may obtain the image 320 having an aspect ratio of 32:9. The controller 930 may control the transmitter 910 to transmit an image signal including the obtained image 320 to the inputter/outputter 832 of the display device 900.

Figure 10:
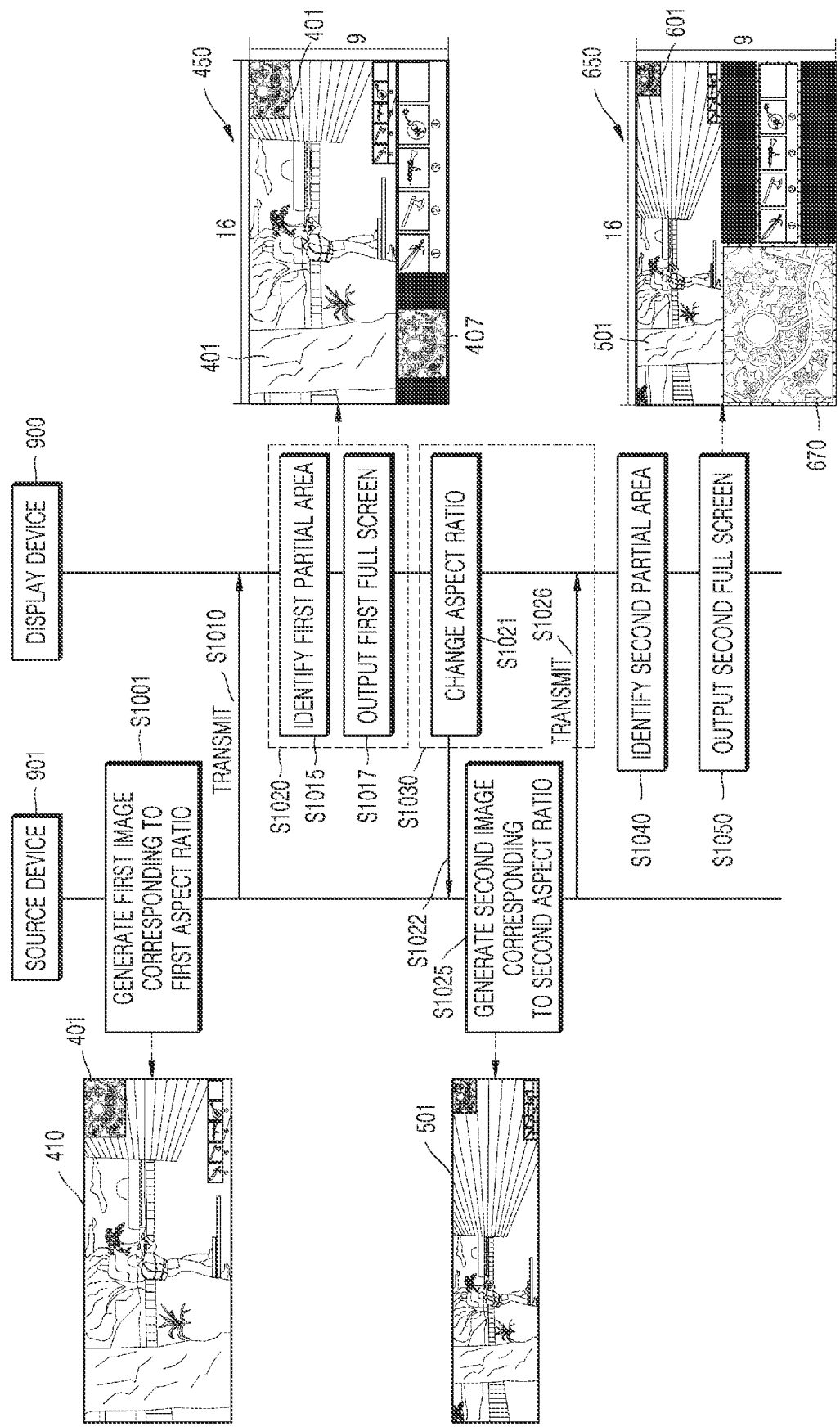
FIG. 10 is a signal flow diagram illustrating example operations performed in a display device, according to various embodiments.

FIG. 10 is a signal flow diagram illustrating example operations performed in a display device, according to various embodiments. In FIG. 10, the same or similar configurations as those of FIGS. 4 to 9 are denoted by the same reference numerals. Thus, a description repeated from FIGS. 1 to 9 is not provided herein to describe the operations shown in FIG. 10. FIG. 10 is described with reference to the elements of the display device 900 and the source device 901 illustrated in FIG. 9.

In FIG. 10, a case in which a full screen aspect ratio of the display device 900 (specifically, a physical aspect ratio of the display 820 included in the display device 900) is 16:9 is shown and described as an example.

The source device 901 may generate an image signal for a first image corresponding to a first aspect ratio (S1001), and transmit the generated image signal to the display device 900 (S1010). For example, the first aspect ratio may be 21:9. For example, the image signal generated in operation S1001 may correspond to the game image 410 described above in relation to FIG. 4.

The display device 900 having received the image signal transmitted in operation S1010 (for example, the image signal for the first image) may output a first full screen 450 including the first image to the display 820, based on the received image signal (S1020).

For example, the display device 900 may identify a first partial area (e.g., 401) to be enlarged, in the first image (S1015), and generate an enlarged image (e.g., 470) corresponding to the identified first partial area. The display device 900 may generate and display the full screen 450 including the enlarged image 407 and the game image 410 having an aspect ratio of 21:9 (S1017).

An aspect ratio of a game image to be output on the display device 900 may be changed to a second aspect ratio (S1021). For example, the second aspect ratio may correspond to an aspect ratio of 32:9. For example, the aspect ratio may be manually changed based on user settings or automatically changed based on screen optimization of the display device 900. As described above in relation to FIG. 9, the display device 900 may reset EDID based on the change of the aspect ratio, and transmit the reset EDID to the source device 901 (S1022).

As such, the source device 901 may generate an image signal for a second image having the second aspect ratio (e.g., 32:9) (S1025), and transmit the generated image signal to the display device 900 (S1026). For example, the image signal generated in operation S1025 may correspond to the game image 501 described above in relation to FIG. 5.

In an embodiment of the disclosure, when the second image (e.g., 501) corresponding to the second aspect ratio different from the first aspect ratio is received from the source device 901, the display device 900 may identify a second partial area (e.g., 601) corresponding to the first partial area (e.g., 401) included in the first image (e.g., 410), in the second image (e.g., 501) based on the first and second aspect ratios (S1040). The display device 900 may generate and display, in lieu or instead of the previously displayed first full screen 450, a second full screen 650 including the second image (e.g., 501) and a second enlarged image (e.g., 670) corresponding to the identified second partial area (e.g., 601) (S1050).

When an aspect ratio of an output image is changed while content is being reproduced, the display device 900 according to an embodiment of the disclosure may identify a partial area to be enlarged (e.g., a partial area corresponding to a partial area set to be enlarged in the image before the aspect ratio is changed), in the image having the changed aspect ratio based on the first and second aspect ratios, and generate an enlarged image based on the identified partial area. As such, the enlarged image display error described above in relation to FIGS. 5 and 7 may be prevented/reduced.

For example, when an aspect ratio of a game image set with a partial area to be enlarged is changed after the game image is displayed, the display device 900 according to an embodiment of the disclosure may flexibly change enlargement of the partial area in response to the change of the aspect ratio. As such, a screen output causing user inconvenience, e.g., enlargement of a wrong area or a reduction in screen use efficiency, may be prevented/reduced.

Therefore, the display device 900 according to an embodiment of the disclosure may minimize/reduce inconvenience of a user who is provided with content, and provide the user with a full screen which is smoothly switched based on a change of an aspect ratio.

Figure 11A:
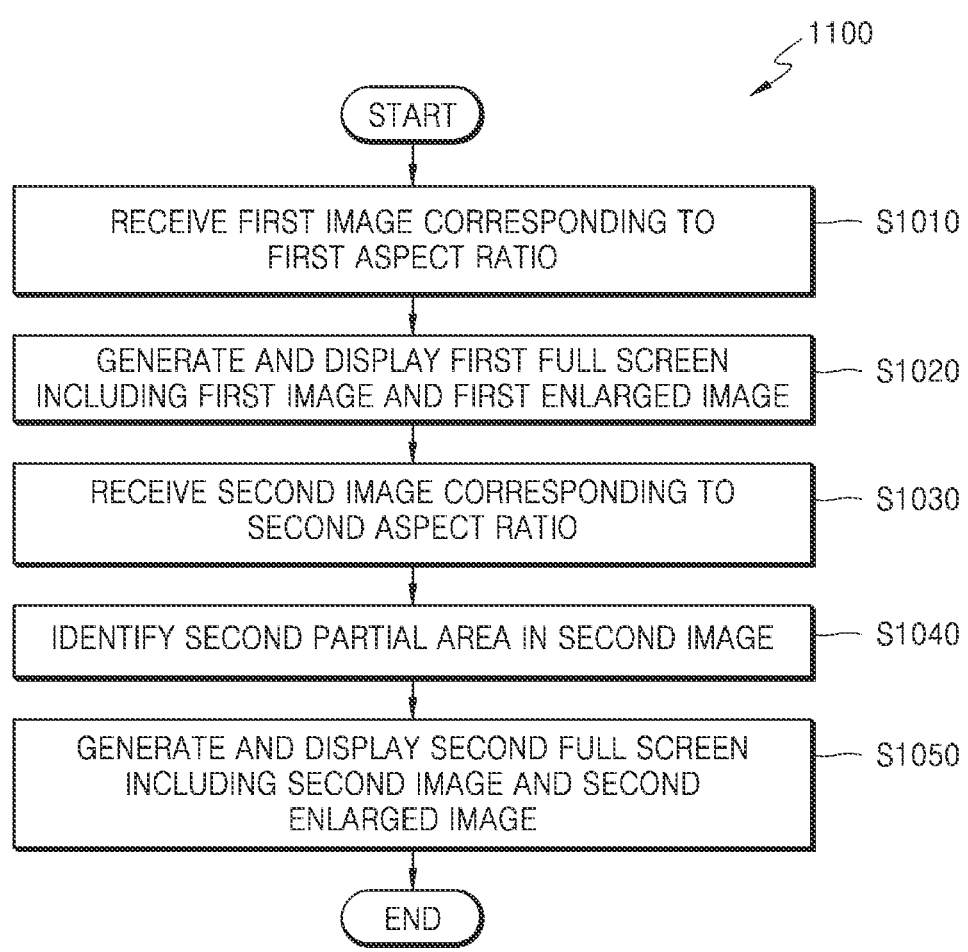
FIG. 11A is a flowchart illustrating an example method of operating a display device, according to various embodiments.

FIG. 11A is a flowchart illustrating an example method of operating a display device, according to various embodiments. For example, an operating method 1100 of a display device, which is shown in FIG. 11A, may represent operations performed by the display device 100, 800, or 900 described above in relation to FIGS. 1 to 10. In FIG. 11A, the same or similar operations as those of FIG. 10 are denoted by the same reference numerals. Therefore, a repeated description from the operations performed by the display device 100, 800, or 900 described above in relation to FIGS. 1 to 10 is not provided herein to describe the operations included in the operating method 1100.

In the following description, a case in which the operating method 1100 is performed by the display device 900 described above in relation to FIG. 9 is described as an example.

Figure 12:
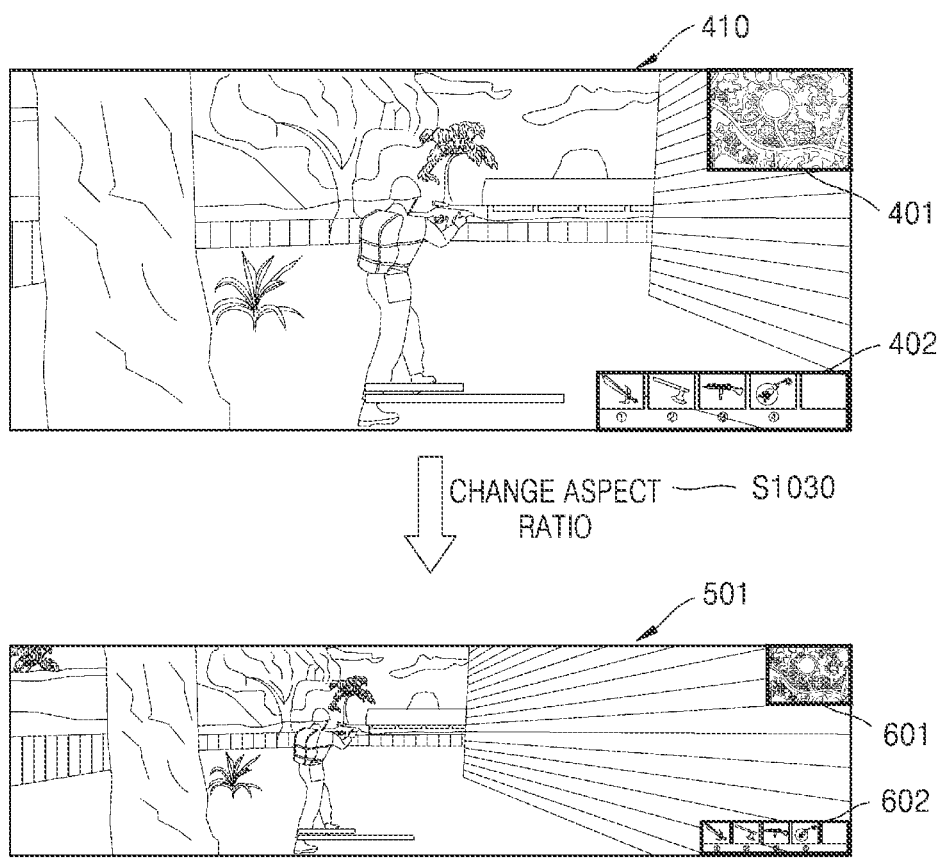
FIG. 12 is a diagram illustrating an example operation of changing an aspect ratio, according to various embodiments.

Images received in the operating method 1100 are described with reference to FIG. 12. In FIG. 12, the same or similar configurations as those of FIGS. 4 to 6 are denoted by the same reference numerals.

Figure 13:
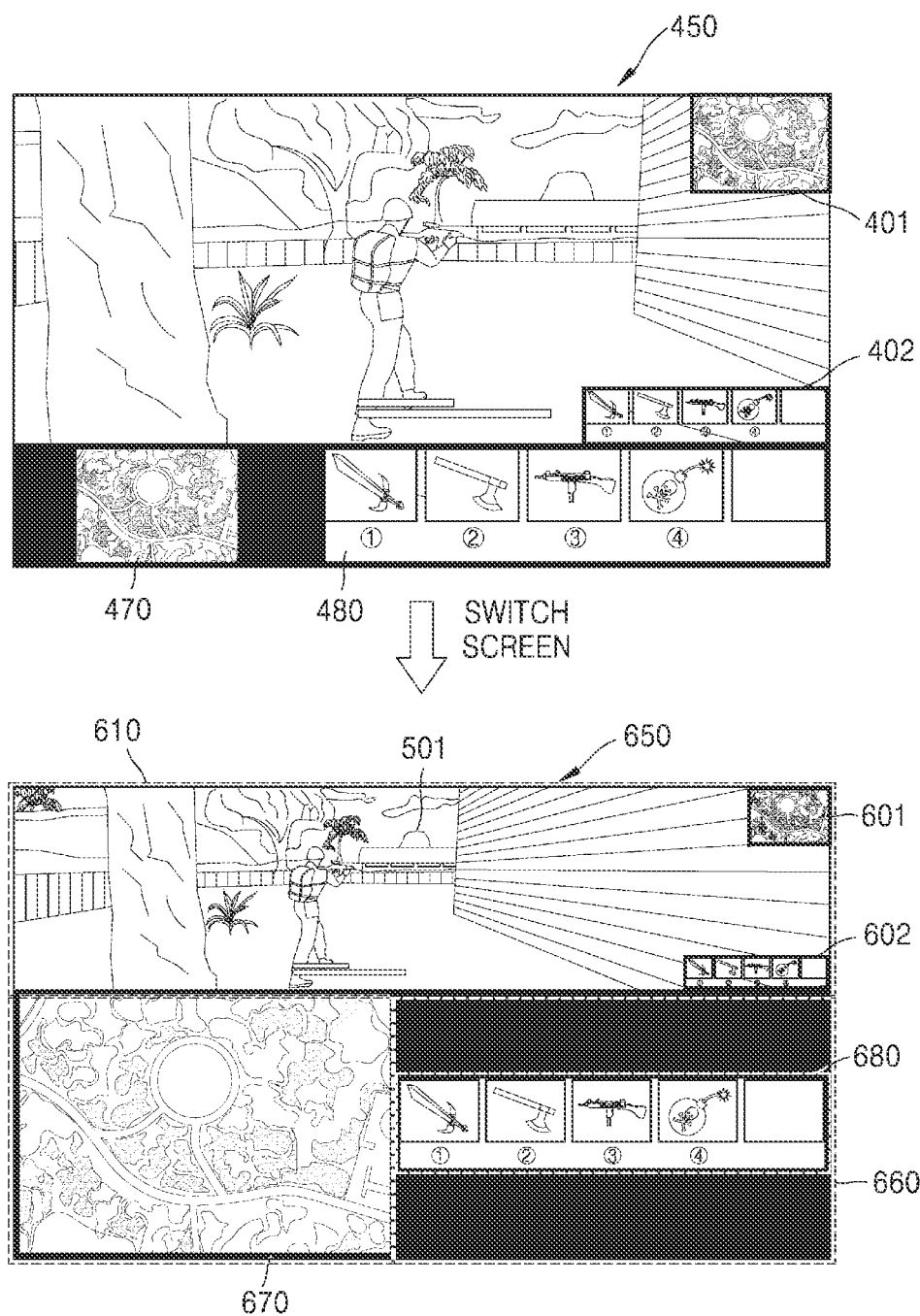
FIG. 13 is a diagram illustrating an example operation of switching a full screen output on a display device, according to various embodiments.

Full screens output in the operating method 1100 are described with reference to FIG. 13. In FIG. 13, the same or similar configurations as those of FIGS. 4 to 6 are denoted by the same reference numerals.

Referring to FIG. 11A, the method 1100 includes receiving, from the source device 901, a first image corresponding to a first aspect ratio (S1010). For example, operation S1010 may be performed by the communication interface 830 under the control of the processor 810. For example, the first image may be received by the inputter/outputter 832 through the HDMI cable 990.

For example, the image processor 920 of the source device 901 may generate the first image corresponding to the first aspect ratio, and the transmitter 910 may transmit the first image (or an image signal for the first image) to the communication interface 830 of the display device 900 under the control of the controller 930. Referring to FIG. 12, the first image received in operation S1010 may be the game image 410 having the first aspect ratio (e.g., an aspect ratio of 21:9).

The method 1100 includes generating and displaying a first full screen including the first image and a first enlarged image corresponding to a first partial area to be enlarged, based on identification of the first partial area in the first image (S1020). Operation S1020 may be performed by the display 820 under the control of the processor 810. For example, the processor 810 may control the image processor 825 to generate an image corresponding to the first full screen, and control the display 820 to output the generated image in full screen.

Referring to FIG. 13, the first full screen output in operation S1020 may be the full screen 450 described above in relation to FIG. 4. In the example of FIG. 13, the first partial area set to be enlarged in the first image may be a partial area corresponding to a sub-window as described above, and include the minimap 401 or the item window 402 included in the game image 410. For example, the full screen 450 may include the game image 410 having the first aspect ratio (e.g., an aspect ratio of 21:9) and the first enlarged image (e.g., 470 or 480). The identification of the first partial area will be described in greater detail below with reference to FIGS. 17 to 19.

The method 1100 includes receiving, from the source device 901, a second image corresponding to a second aspect ratio different from the first aspect ratio (S1030). For example, operation S1030 may be performed by the communication interface 830 under the control of the processor 810. For example, the second image may be received by the inputter/outputter 832 through the HDMI cable 990.

The second image may be output and transmitted from the source device 901 based on a user request. For example, the display device 900 may control the source device 901 to transmit the second image having the second aspect ratio, based on a user request received while the first image having the first aspect ratio is being received from the source device 901.

For example, the processor 810 may provide control to receive the second image having the changed aspect ratio, e.g., the second aspect ratio, from the source device 901, based on a user input received while the first image is being received from the source device 901. For example, the processor 810 may control the communication interface 830 to receive the second image having the changed aspect ratio, e.g., the second aspect ratio, from the source device 901, based on a user input received while the first image is being received from the source device 901.

For example, the processor 810 may receive a user input for requesting to change an aspect ratio (e.g., a user input for requesting to change the first aspect ratio to the second aspect ratio), through the user interface 870 while the first image having the first aspect ratio is being received from the source device 901. The processor 810 may change or reset EDID in response to the change of the aspect ratio based on the user input. The EDID change operation is described in detail above in relation to FIG. 9, and thus a detailed description thereof is not provided herein. Subsequently, the processor 810 may control the source device 901 to generate the second image having the second aspect ratio and transmit the generated second image to the display device 900, by transmitting the changed EDID to the source device 901.

For example, the image processor 920 of the source device 901 may generate the second image corresponding to the second aspect ratio, and the transmitter 910 may transmit the second image (or an image signal for the second image) to the communication interface 830 of the display device 900 under the control of the controller 930. Referring to FIG. 12, the second image received in operation S1030 may be the game image 501 having the second aspect ratio (e.g., an aspect ratio of 32:9).

When the second image is received in operation S1030, the method 1100 includes identifying a second partial area corresponding to the first partial area, in the second image based on the first and second aspect ratios (S1040). For example, operation S1040 may be performed by the processor 810.

Referring to the example of FIGS. 12 and 13, when the aspect ratio of the displayed image is changed (S1021 (see FIG. 10)), the second image (e.g., the game image 501 having an aspect ratio of 32:9) may be received. The processor 810 may identify the second partial area (e.g., 601 or 602) corresponding to the first partial area (e.g., 401 or 402), in the second image such as the game image 501 based on the first and second aspect ratios. When the second partial area (e.g., 601 or 602) is identified, the enlarged image (e.g., 670 or 680) corresponding to the second partial area (e.g., 601 or 602) may be generated. Subsequently, the processor 810 may control the image processor 825 and the display 820 to generate and display the full screen 650 including the generated second enlarged image (e.g., 670 or 680).

For example, referring to the example of FIG. 13, the processor 810 may identify the second partial area (e.g., 601 or 602) including the same image object as an image object displayed on the first partial area (e.g., 401 or 402) included in the first image (e.g., the game image 410), in the second image (e.g., the game image 501) based on the first and second aspect ratios, and obtain the second enlarged image (e.g., 670 or 680) corresponding to the identified second partial area (e.g., 601 or 602). The processor 810 may control the image processor 825 and the display 820 to generate and display the full screen 650 in which the obtained second enlarged image (e.g., 670 or 680) is positioned on a black area.

When the first and second aspect ratios are known, a partial area of the game image 501 having the second aspect ratio, which corresponds to a certain partial area of the game image 410 having the first aspect ratio (e.g., a partial area where a minimap is displayed) may be extracted. For example, a screen enlargement or reduction ratio set in a horizontal direction may be present between the first image having the first aspect ratio (e.g., the game image 410 having an aspect ratio of 21:9) and the second image having the second aspect ratio (e.g., the game image 501 having an aspect ratio of 32:9). Therefore, when the first and second aspect ratios are known, a partial area on the second image having the second aspect ratio, which corresponds to a specific partial area on the first image having the first aspect ratio may be identified. Accordingly, the processor 810 may identify the second partial area (e.g., 601 or 602) corresponding to the first partial area (e.g., 401 or 402) included in the first image such as the game image 410, in the second image such as the game image 501 based on the first and second aspect ratios.

The processor 810 may identify the second partial area (e.g., 601 or 602) corresponding to the first partial area (e.g., 401 or 402) in a different manner. For example, the processor 810 may identify an image object displayed on the first partial area (e.g., 401 or 402), and identify the same image object as the identified image object (specifically, the image object displayed on the first partial area (e.g., 401 or 402)), in the second image such as the game image 501. For example, the processor 810 may identify, as the second partial area (e.g., 601 or 602), an area in the second image such as the game image 501, where an image object having a similarity greater than or equal to a threshold value to the image object displayed on the first partial area (e.g., 401 or 402). Herein, the image object having a similarity greater than or equal to the threshold value may be detected based on machine learning. For example, based on machine learning, the game image 410 may be compared to the game image 501, and partial areas where the same image object (e.g., a minimap) is displayed may be extracted from the two images.

When the second partial area is identified in operation S1040, the method 1100 includes generating and displaying a second full screen including the second image and a second enlarged image corresponding to the identified second partial area (S1050). For example, the processor 810 may control the image processor 825 to generate an image corresponding to the second full screen, and control the display 820 to output the generated image in full screen. Referring to FIG. 13, the second full screen output in operation S1050 may be the full screen 650 described above in relation to FIG. 6.

To generate and output the second full screen, the processor 810 may consider whether a physical aspect ratio of the display 820 is the same as or different from the second aspect ratio.

Referring to the example of FIG. 13, when the physical aspect ratio of the display 820 is different from the second aspect ratio, after the second image (e.g., 501 of FIG. 13) having the second aspect ratio is displayed on the second full screen (e.g., 650 of FIG. 13), a black area may unavoidably occur. Therefore, when the physical aspect ratio of the display 820 is different from the second aspect ratio, the enlarged image 670 or 680 may be displayed on the black area as shown in FIG. 13.

When the physical aspect ratio of the display 820 is the same as the second aspect ratio, and when the second image is displayed at the maximum size on the second full screen (e.g., 650 of FIG. 13), the second full screen is filled with the second image and no black area occurs. In this case, to display the enlarged image, the processor 810 may split the second full screen into a plurality of screens, and display the second image and the second enlarged image separately in the split plurality of areas.

For example, when the aspect ratio of the display 820 is the same as the second aspect ratio, the processor 810 may split the full screen of the display 820 into two partial screens, and display the second image in one partial screen and display the second enlarged image in the other partial screen.

Figure 11B:
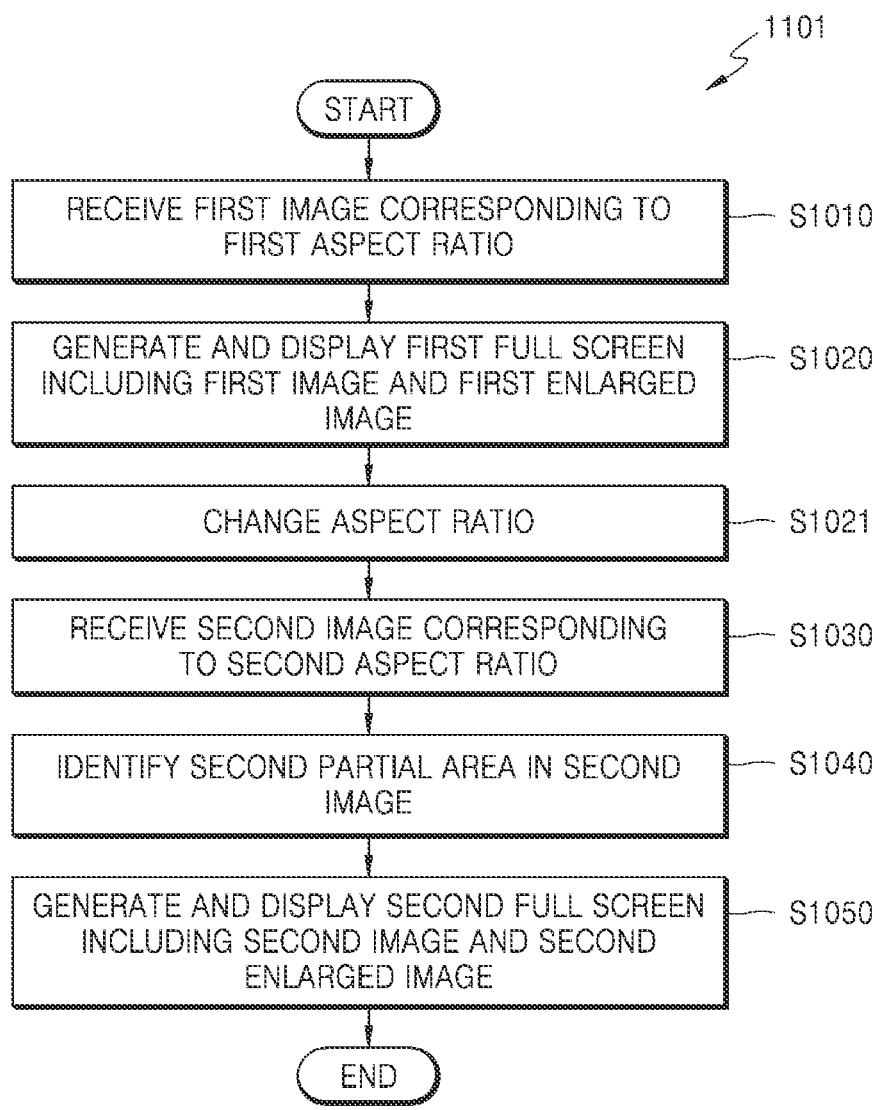
FIG. 11B is a flowchart illustrating an example method of operating a display device, according to various embodiments.

FIG. 11B is a flowchart illustrating an example method of operating a display device, according to various embodiments. In FIG. 11B, the same or similar configurations as those of FIG. 11A are denoted by the same reference numerals. In FIG. 11B, the same operations as those of FIG. 10 are denoted by the same reference numerals.

Referring to FIG. 11B, compared to the operating method 1100 of FIG. 11A, an operating method 1101 of a display device may further include operation S1021.

Referring to FIGS. 10 and 11B, after the first full screen (e.g., 450) is output in operation S1020, the operating method 1101 may further include changing an aspect ratio of an image output on the display device 900 (S1021).

For example, the aspect ratio may be changed based on a user input. The display device 900 may receive, through the user interface 870, a user input for requesting to change the aspect ratio. For example, when a user input for requesting to change the aspect ratio of the image (e.g., a game image) corresponding to currently reproduced content from the first aspect ratio to a second aspect ratio is received through the user interface 870, the processor 810 may change the aspect ratio in response to the reception of the user input. Specifically, as described above in relation to FIG. 9, the processor 810 may reset EDID based on the change of the aspect ratio, and transmit the reset EDID to the source device 901, thereby providing control to change the aspect ratio.

The aspect ratio change operation based on the user input is described in greater detail with below reference to FIG. 14.

Figure 14:
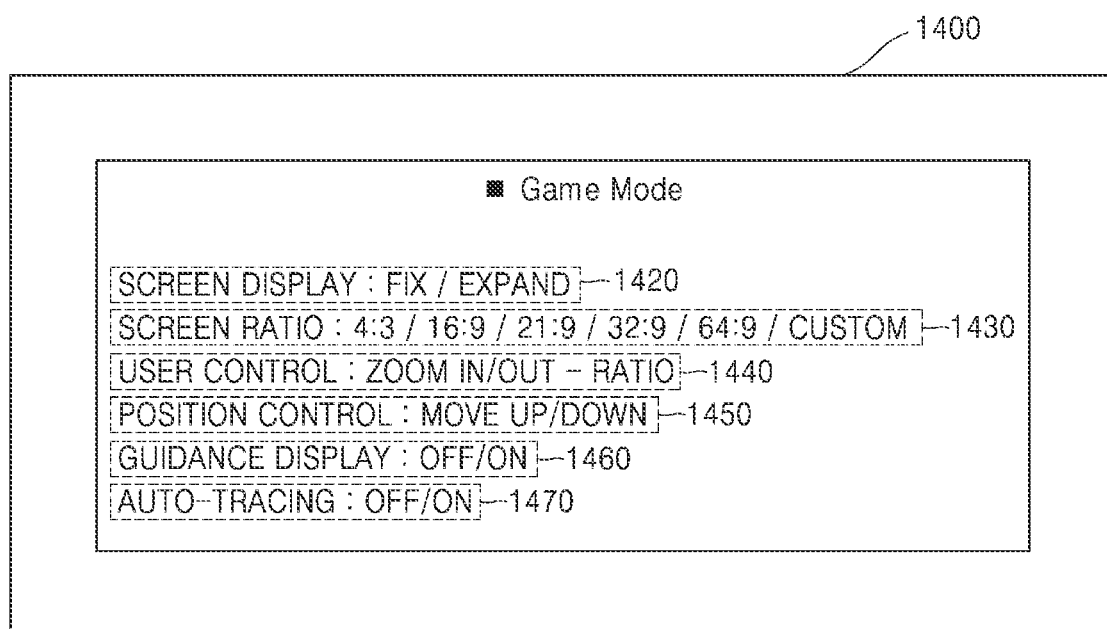
FIG. 14 is a diagram illustrating an example of a user interface screen displayed on a display device, according to various embodiments.

FIG. 14 is a diagram illustrating an example of a user interface screen displayed on a display device, according to various embodiments.

In an embodiment of the disclosure, an aspect ratio may be changed by changing screen settings or by manually changing the aspect ratio.

For example, when a user input corresponding to screen settings is received, the processor 810 may provide control to output a user interface screen 1400 for screen settings, in response to the received user input.

For example, during a game, a user may want a game image to be output as a wider screen to play the game more realistically and immersively. For example, when the user who wants to change an aspect ratio of the game image presses a screen settings key of a remote controller (not shown), the processor 810 may provide control to output the user interface screen 1400, in response to the received user input.

Then, the user may select an aspect ratio change menu 1430 on the output user interface screen 1400, and change the aspect ratio to a desired screen ratio (or aspect ratio) in the aspect ratio change menu 1430. For example, when the user selects '32:9' in the aspect ratio change menu 1430, the processor 810 may change the aspect ratio of the game image to 32:9 based on the user input.

In addition, the user interface screen 1400 may further include at least one of a menu 1420 for determining whether to fix or expand a screen display, a menu 1440 for setting a ratio for enlarging or reducing a screen, a menu 1450 for adjusting a position where an image is output, a menu 1460 for providing guidance or recommendation to set a partial area to be enlarged (hereinafter referred to as a 'guidance recommendation menu'), or a menu 1470 for automatically tracing a moving object in a game image (hereinafter referred to as an 'auto-tracing menu'). The guidance recommendation menu 1460 will be described below with reference to FIGS. 17 to 21. The auto-tracing menu 1470 will be described below with reference to FIG. 18.

Figure 15:
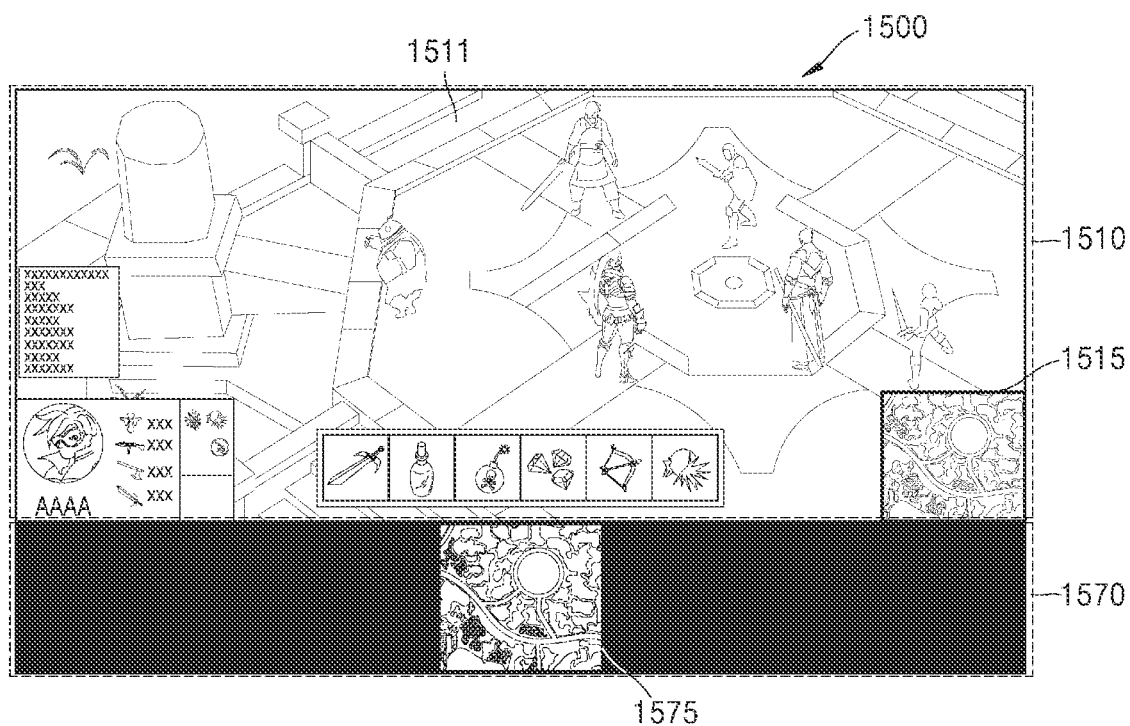
FIG. 15 is a diagram illustrating an example of a full screen displayed on a display device, according to various embodiments.

FIG. 15 is a diagram illustrating an example of a full screen displayed on a display device, according to various embodiments.

Figure 16:
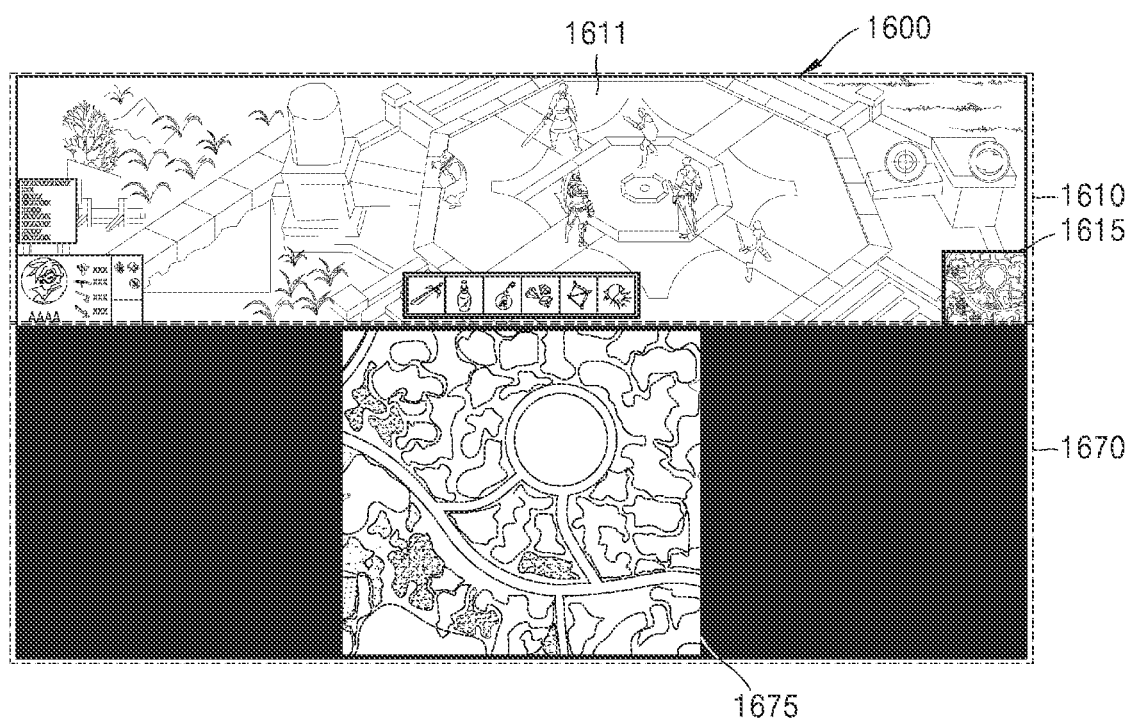
FIG. 16 is a diagram illustrating an example of a full screen displayed on a display device, according to various embodiments.

FIG. 16 is a diagram illustrating an example of a full screen displayed on a display device, according to various embodiments.

In FIGS. 15 and 16, a case in which an aspect ratio of a second image is different from a physical aspect ratio of the display 820 is shown as an example. The physical aspect ratio of the display 820 refers to a ratio of a horizontal length to a vertical length of a display panel provided as the display 820, and may also be referred to as 'a display aspect ratio'.

For example, when the aspect ratio of the display 820 is different from a second aspect ratio, the processor 810 may provide control to display a second enlarged image on at least a part of a remaining area other than an area where the second image is displayed on a full screen of the display 820.

In FIG. 15, a case in which the aspect ratio of the display 820 is 16:9 and the second aspect ratio is 21:9 and in which a partial area to be enlarged is an area 1515 where a minimap is displayed is shown as an example.

Referring to the example of FIG. 15, a second full screen 1500 may include an area 1510 where the second image such as a game image 1511 is displayed, and a remaining area 1570 other than the area 1510 where the second image 1511 is displayed. Herein, the area 1570 where the game image 1511 is not displayed on the second full screen 1500 may be referred to as a 'remaining area' for convenience of explanation. In FIG. 15, a case in which a partial area set to be enlarged in the second image 1511 is the area 1515 where the minimap is displayed is shown as an example.

When the aspect ratio of the display 820 is different from the second aspect ratio indicating an aspect ratio of the second image such as the game image 1511, as shown in FIG. 15, the second full screen 1500 unavoidably includes the remaining area 1570 where the game image 1511 is not displayed. For example, a second enlarged image 1575 corresponding to a second partial area 1515 indicating the area 1515 where the minimap is displayed may be displayed in the remaining area 1570.

For example, the processor 810 may provide control to display the second enlarged image 1575 on at least a part of the remaining area 1570 other than the area 1510 where the second image 1511 is displayed on the second full screen 1500.

In an embodiment of the disclosure, when the second partial area 1515 is identified, the processor 810 may provide control to display the second full screen 1500 including the second partial area 1515 and the second image 1511. To output the second full screen 1500, the processor 810 may generate the second full screen 1500 so as to maximize/increase screen use efficiency. When the screen use efficiency is maximized/increased, it may refer, for example, to display of a meaningless image (e.g., a black area) being minimized/reduced and display of a meaningful image is maximized/increased in a full screen. For example, the 'meaningless image' may refer to an area other than an area used to provide information or content to a user, e.g., a black area. The 'meaningless image' may refer to an area other than an area provided to the user for artistic and aesthetic purposes.

In an embodiment of the disclosure, to display the second full screen 1500 in operation S1050, the processor 810 may adjust at least one of the size or position of the second enlarged image 1575 included in the second full screen 1500, based on the second aspect ratio and the full screen aspect ratio of the display 820.

For example, to display the second enlarged image 1575 in the remaining area 1570, the processor 810 may adjust the size of the second enlarged image 1575 so as to maximize/increase the size of the second enlarged image 1575. As such, the second full screen 1500 may be displayed as shown in FIG. 15. The position of the second enlarged image 1575 included in the remaining area 1570 may be determined based on at least one of user settings or automatic settings of the processor 810.

For example, the position where the second enlarged image 1575 is displayed may be adjusted so as to increase user satisfaction. For example, the processor 810 may provide control to display the second enlarged image 1575 at a position the most easily viewed to the user on the full screen (e.g., the center of the screen or a position corresponding to a FoV of the user).

In FIG. 16, a case in which the aspect ratio of the display 820 is 16:9 and the second aspect ratio is 32:9 and in which a partial area to be enlarged is an area 1615 where a minimap is displayed, as in FIG. 15, is shown as an example.

Referring to the example of FIG. 16, a second full screen 1600 may include an area 1610 where the second image such as a game image 1611 is displayed, and a remaining area 1670 other than the area 1610 where the second image 1611 is displayed.

For example, to display a second enlarged image 1675 in the remaining area 1670, the processor 810 may adjust the size of the second enlarged image 1675 so as to maximize/increase the size of the second enlarged image 1675. As such, the second full screen 1600 may be displayed as shown in FIG. 16.

Figure 17:
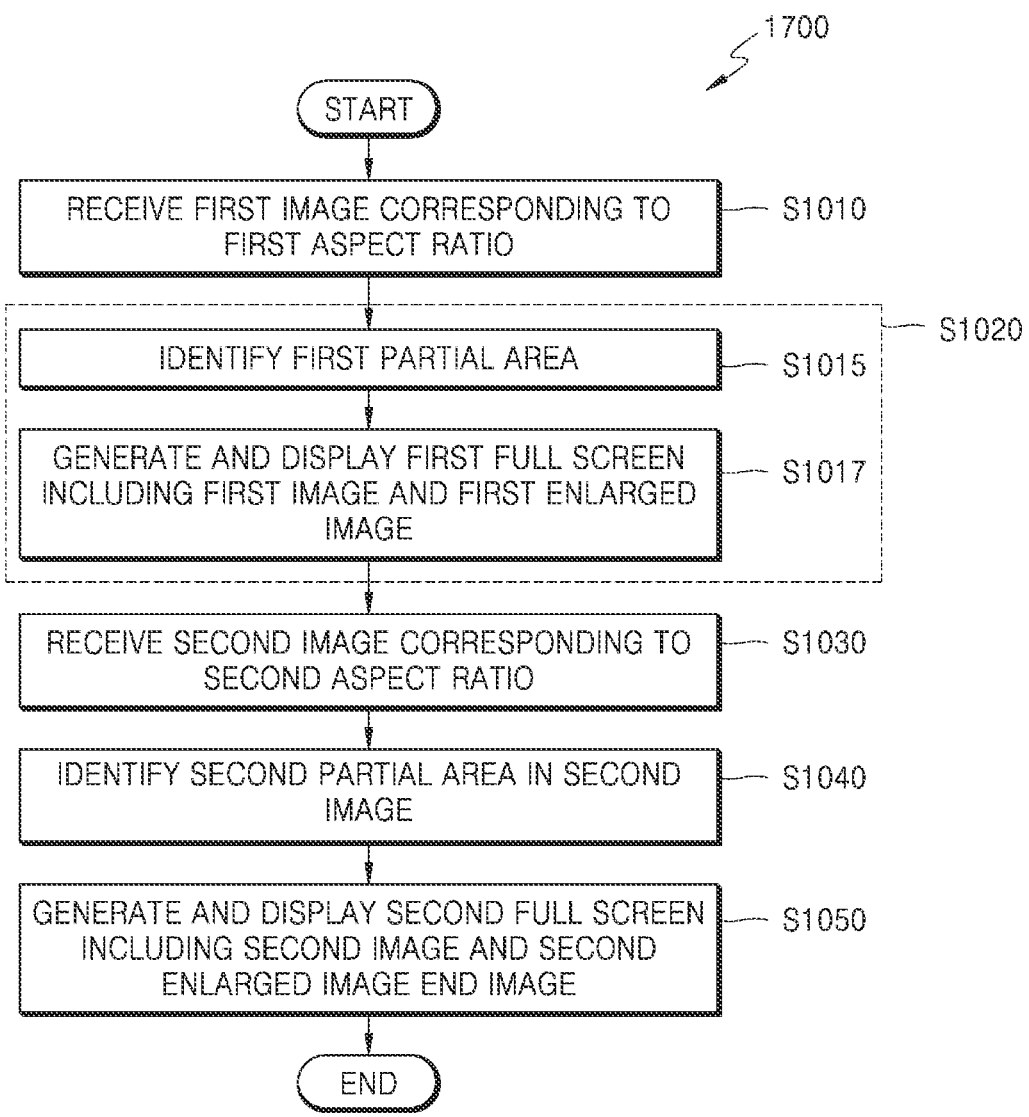
FIG. 17 is a flowchart illustrating an example method of operating a display device, according to various embodiments.

FIG. 17 is a flowchart illustrating an example method of operating a display device, according to various embodiments. In FIG. 17, the same or similar operations as those of FIG. 10 are denoted by the same reference numerals. In FIG. 17, the same configurations as those of FIG. 11A are denoted by the same reference numerals.

In the following description, a case in which an operating method 1700 of a display device is performed by the display device 900 described above in relation to FIG. 9 is described as an example.

Referring to FIG. 17, the operating method 1700 may include identifying a first partial area to be enlarged (e.g., 401) in the first image received in operation S1010 (S1015). Operation S1015 may be performed by the processor 810. Operation S1015 will be described in detail below with reference to FIG. 18.

The method 1700 may include generating and displaying a first full screen including the first image and a first enlarged image corresponding to the first partial area identified in operation S1015 (S1017).

Figure 18:
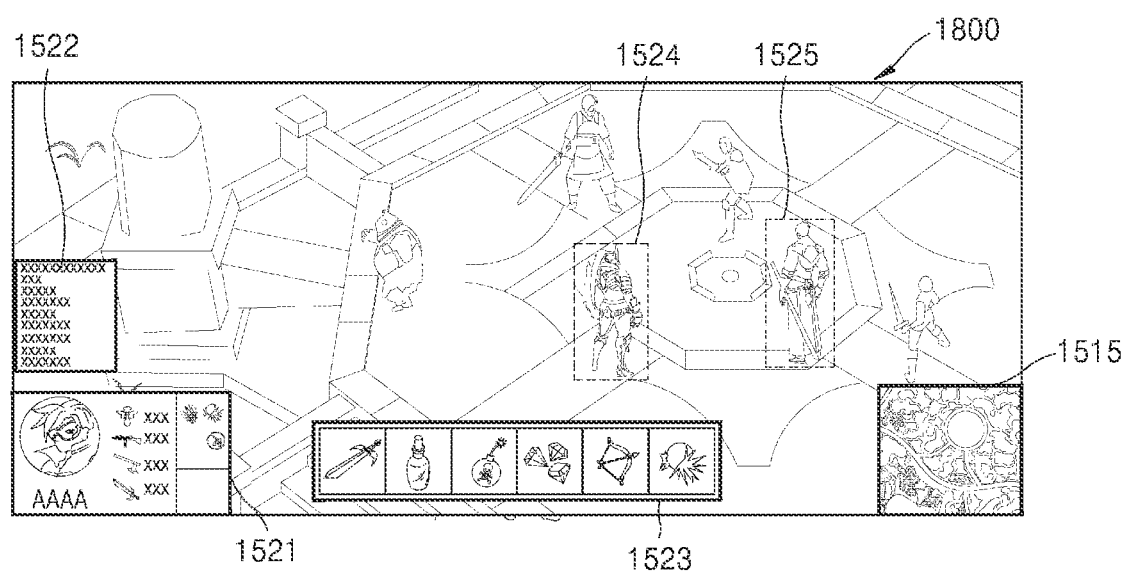
FIG. 18 is a diagram illustrating an example game image according to various embodiments.

FIG. 18 is a diagram illustrating an example game image according to various embodiments. A first image 1800 shown as the game image in FIG. 18 may correspond to the game image 1511 shown in FIG. 15, and the same or similar configurations are denoted by the same reference numerals.

Referring to FIG. 18, the display device 900 may receive the first image (e.g., game image) 1800. A case in which the first image 1800 is an image of a battle game played using at least one moving character is shown as an example. In the shown example, the first image 1800 may be a reproduction image of the game, and the reproduction image of the game may include at least one moving object 1524 or 1525. Herein, the at least one moving object 1524 or 1525 may represent a character corresponding to a user who plays the battle game.

The first image 1800 may include at least one of a minimap 1515, an item window 1523, a character window 1521, a chat window 1522, or a current status information window (not shown).

For example, a first partial area may be manually identified based on a user input. For example, the processor 810 may identify a partial area included in the first image 1800, e.g., the first partial area, based on a user input for selecting the partial area included in the first image 1800.

For example, when the first image 1800 is received, the processor 810 may control the image processor 825 and the display 820 to output a screen including the first image 1800. Then, a user may view the first image 1800 and input, to the user interface 870, a user input for selecting a partial area of the first image 1800. Then, the processor 810 may identify the area selected by the user, as the first partial area based on the user input. For example, the user may view the game image 1800 and input, to the user interface 870, a user input for selecting an area where the minimap 1515 is displayed in the game image 1800. Then, the processor 810 may identify the area where the minimap 1515 is displayed, as the first partial area based on the user input.

For example, when the first image 1800 is received, the processor 810 may output a user interface screen for setting the first partial area in the first image 1800. The user interface screen includes the first image 1800 as a main screen, and may include a guidance message such as 'Set areas to be enlarged'. Then, the user may input, through the user interface 870, a user input for selecting an area to be enlarged (e.g., the area where the minimap 1515 is displayed) in the first image 1800 displayed on the user interface screen.

As another example, the first partial area may be automatically identified by the processor 810.

For example, when the first image 1800 is received, the processor 810 may identify, as the first partial area, an area where at least one of the at least one moving object 1524 or 1525, the minimap 1515, the item window 1523, the character window 1521, the chat window 1522, or the current status information window included in the first image 1800 is displayed. For example, the processor 810 may use optical character recognition (OCR) or automatic content recognition (ACR) to identify the first partial area. For example, the processor 810 may identify the area where at least one of the at least one moving object 1524 or 1525, the minimap 1515, the item window 1523, the character window 1521, the chat window 1522, or the current status information window included in the first image 1800 is displayed, by performing OCR or ACR on the game image 1800 corresponding to content.

As another example, when the first image 1800 is received, the processor 810 may identify the first partial area using artificial intelligence (AI) technology. For example, the AI technology may be implemented using algorithms. Herein, an algorithm or a set of algorithms for implementing the AI technology is called a neural network. Herein, the neural network may receive input data, analyze the input data, and output desired resultant data. In order to accurately output the resultant data corresponding to the input data, the neural network needs to be trained. Herein, when the neural network is 'trained', it may refer, for example, to various types of data being input to the neural network and the neural network is trained to autonomously find or learn a method of analyzing the input data, a method of classifying the input data, and/or a method of extracting, from the input data, feature data required to generate resultant data.

A set of algorithms for outputting output data corresponding to input data through the above-described neural network, software for executing the set of algorithms, and/or hardware for executing the set of algorithms may be referred to as an 'AI model'.

The AI model may be provided in a wide variety of forms. Specifically, a variety of AI models for receiving an input image, analyzing the input image, and classifying an object included in the image, into at least one class may be present.

Figure 19:
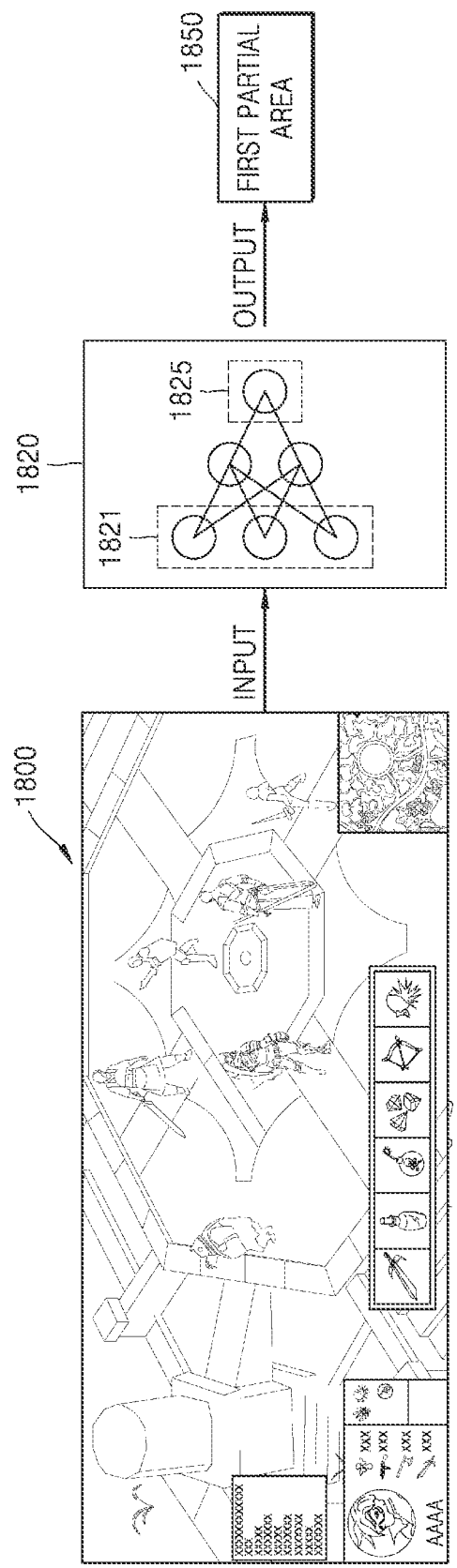
FIG. 19 is a diagram illustrating an example operation of identifying a partial area included in a game image according to various embodiments.

The AI model may include at least one neural network, and a case in which the AI model includes one neural network 1820 is shown as an example in FIG. 19 for convenience of explanation.

FIG. 19 is a diagram illustrating an example operation of identifying a partial area included in a game image according to various embodiments.

For example, a method of performing object recognition, object tracking, and/or object discrimination using AI technology for performing computation through a neural network is being developed and used. In the following description, for convenience of explanation, operations of performing object recognition, object tracking, and object discrimination to recognize a specific image object by analyze an image are collectively called 'object recognition'.

For example, the neural network may be a deep neural network (DNN) including a plurality of layers to perform computation at multiple layers. The DNN computation may include convolutional neural network (CNN) computation. For example, a data recognition model for object recognition may be implemented through the shown neural network 1820, and the implemented recognition model may be trained using training data. By analyzing input data, e.g., a received image, using the trained data recognition model, an object may be recognized in the input image and the recognized object may be output as output data. The CNN refers to any neural network for performing an algorithm to analyze an image and find a pattern, and may have various types and forms.

Referring to the example of FIG. 19, the neural network 1820 may be a neural network trained to receive the first image (e.g., game image) 1800 and extract and output an image object displayed on a partial area included in the image 1800 (e.g., a first partial area).

Referring to FIG. 19, the neural network 1820 may be a neural network trained to receive the first image 1800 through an input layer 1821, extract a first partial area 1850 included in the input image 1800, and output the extracted first partial area 1850 or information about the first partial area 1850 to an output end 1825.

For example, the neural network 1820 may be trained to receive a plurality of game images and extract a partial area required to be enlarged, e.g., a first partial area, in the plurality of game images.

For example, the neural network 1820 may receive additional information about a game and a game image, and extract the first partial area 1850 required to be enlarged in the certain game (e.g., an area where a minimap is display), or an image object included in the first partial area 1850 (e.g., the minimap). Herein, the 'additional information' may include at least one of information about content (e.g., the name of a game or attributes of the game), information about an object required to be enlarged in the content (e.g., the game), or information about a sub-window included in an image of the content (e.g., a game image). Herein, the additional information may be provided from the source device 901.

For example, the neural network 1820 may be trained based on additional information about a plurality of games to obtain information about a partial area required to be enlarged (e.g., information about the type of an image object included in the partial area, or the position where the image object is displayed) for each of the plurality of games. For example, the neural network 1820 may be trained based on game images and additional information about each of the plurality of games. As such, when a certain game image is input, the trained neural network 1820 identify the type of a game corresponding to the certain game image (e.g., game A), and identify or extract a partial area or an image object based on the identified type of the game.

For example, a partial area to be enlarged for a user may vary depending on the type of the game. The neural network 1820 may extract and output a partial area or an image object to be enlarged in each game, based on the additional information of the game.

For example, when a game A image is input to the trained neural network 1820, the neural network 1820 may extract and output areas where a minimap and an item window are displayed, as partial areas required to be enlarged in the game A image. When a game B image is input to the trained neural network 1820, the neural network 1820 may extract and output areas where an auto-tracing menu for enlarging a moving object, and a minimap are displayed, as partial areas required to be enlarged in the game B image.

For example, the above-described neural network 1820 may be implemented in the processor 810. In this case, the processor 810 may input an image (e.g., a game image) to the neural network 1820, and the neural network 1820 may select, extract, and output at least one first partial area (specifically, at least one partial area 1850 to be enlarged) by analyzing the input image.

The neural network 1820 may be implemented in an external server or an external device which is separate from the display device 900. In this case, the display device 900 may transmit an image (e.g., a game image) corresponding to content to be reproduced, to the neural network (not shown) implemented in the external server or the external device, and receive, through the communication interface 830, a result output from the neural network (not shown) (e.g., a first partial area or information about the first partial area). For example, when the above-described neural network is implemented in an external server connected through an Internet network, the display device 900 may transmit an image (e.g., a game image) through the communicator 831 to the external server (not shown). Then, the external server (not shown) may input the received image to the neural network, and transmit a result output from the neural network, to the communicator 831 of the display device 900.

Using the methods described above in relation to FIGS. 18 and 19, the display device 900 may identify a first partial area (e.g., 401) to be enlarged in the first image (S1015), and generate an enlarged image corresponding to the identified first partial area.

Figure 20:
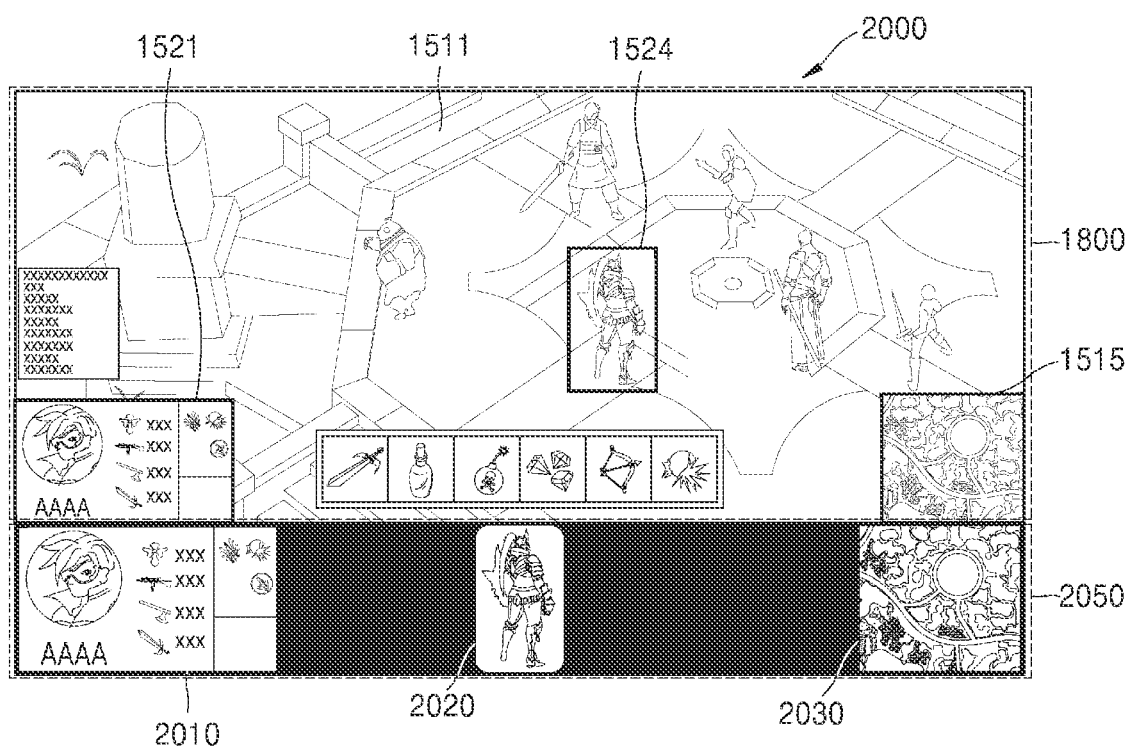
FIG. 20 is a diagram illustrating an example of a full screen output according to various embodiments.

FIG. 20 is a diagram illustrating an example of a full screen output according to various embodiments. In FIG. 20, the same or similar configurations as those of FIGS. 15 and 18 are denoted by the same reference numerals. For example, a full screen 2000 shown in FIG. 20 may be a full screen output on a display device (e.g., 900) according to an embodiment of the disclosure. The full screen 2000 may be a screen output in operation S1017 of the operating method 1700 shown in FIG. 17.

Referring to FIGS. 17 and 20, when the first partial area is identified in operation S1015, the operating method 1700 may include generating and displaying a first full screen 2000 including the first image 1800 and a first enlarged image corresponding to the first partial area identified in operation S1015 (S1017). For example, the first full screen 2000 may include at least one first enlarged image corresponding to at least one first partial area. In FIG. 20, a case in which the first full screen 2000 includes three enlarged images 2010, 2020, and 2030 corresponding to three first partial areas (e.g., 1521, 1524, and 1515 is shown as an example.

For example, in operation S1015, the processor 810 may identify at least one partial area included in the first image 1800. For example, the processor 810 may identify the character window 1521, the moving object 1524, and the minimap 1515 as first partial areas to be enlarged in the first image 1800.

The processor 810 may generate at least one first enlarged image corresponding to the identified at least one first partial area. For example, the processor 810 may control the image processor 825 to generate the at least one first enlarged image corresponding to the identified at least one first partial area. Based on the generated at least one first enlarged image, the first full screen 2000 including the first image 1800 and the at least one first enlarged image may be generated and displayed (S1017). The generation of the enlarged image will be described in detail below with reference to FIG. 25.

Figure 21:
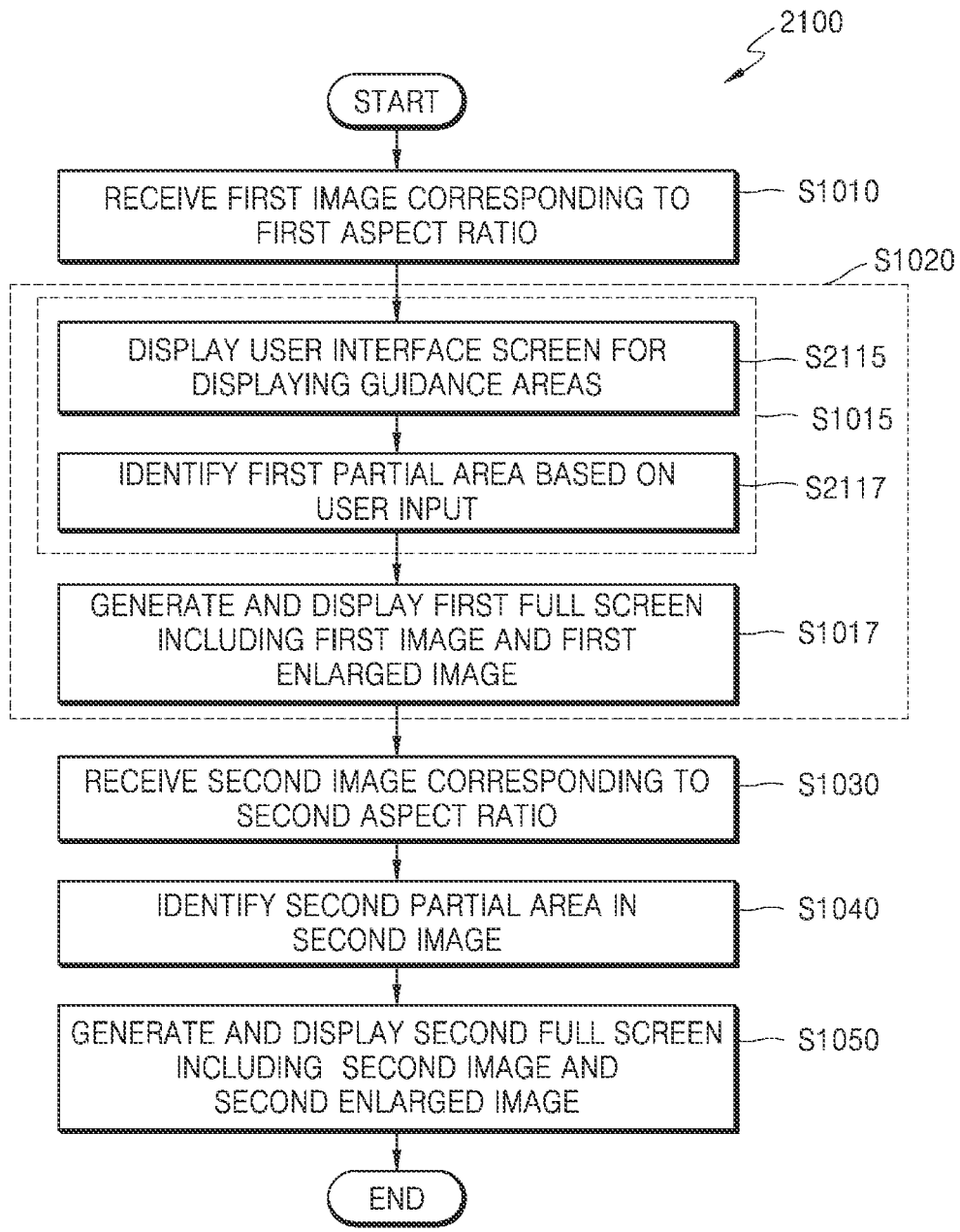
FIG. 21 is a flowchart illustrating an example method of operating a display device, according to various embodiments.

FIG. 21 is a flowchart illustrating an example method of operating a display device, according to various embodiments. In FIG. 21, the same or similar operations as those of FIGS. 10 to 17 are denoted by the same reference numerals.

In the following description, a case in which an operating method 2100 of a display device is performed by the display device 900 described above in relation to FIG. 9 is described as an example.

In an embodiment of the disclosure, operation S1015 for identifying the first partial area may be performed based on a user input. For example, operation S1015 may include displaying a user interface screen for displaying guidance areas (S2115), and identifying the first partial area based on a user input (S2117).

Referring to FIG. 21, after operation S1010, the operating method 2100 may include displaying a user interface screen for displaying one or more guidance areas on the first image received in operation S1010 (S2115). For example, the processor 810 may control the image processor 825 and the display 820 to output the user interface screen.

Operation S2115 may be automatically performed based on operation S1010. Alternatively, when the first image is received in operation S1010, operation S2115 may be performed based on a user input for requesting to display the user interface screen for displaying the guidance areas. That is, when a user of the display device 900 wants to manually set the first partial area to be enlarged in the first image, the user may input, to the display device 900, a request or user input for requesting to perform operation S2115.

Herein, the guidance areas may be areas which are used to select an area required to be enlarged (e.g., the first partial area), and are defined by guidance lines for displaying partial areas included in the first image. The user interface screen output in operation S2115 will be described below with reference to FIGS. 22 and 23.

For example, the user may view the user interface screen output in operation S2115, and input, to the display device 900, a user input for selecting at least one of the one or more guidance areas displayed on the user interface screen. As such, the display device 900 may receive, through the user interface 870, the user input for selecting the guidance area. The processor 810 may identify the first partial area corresponding to the selected guidance area, based on reception of a user input.

Figure 22:
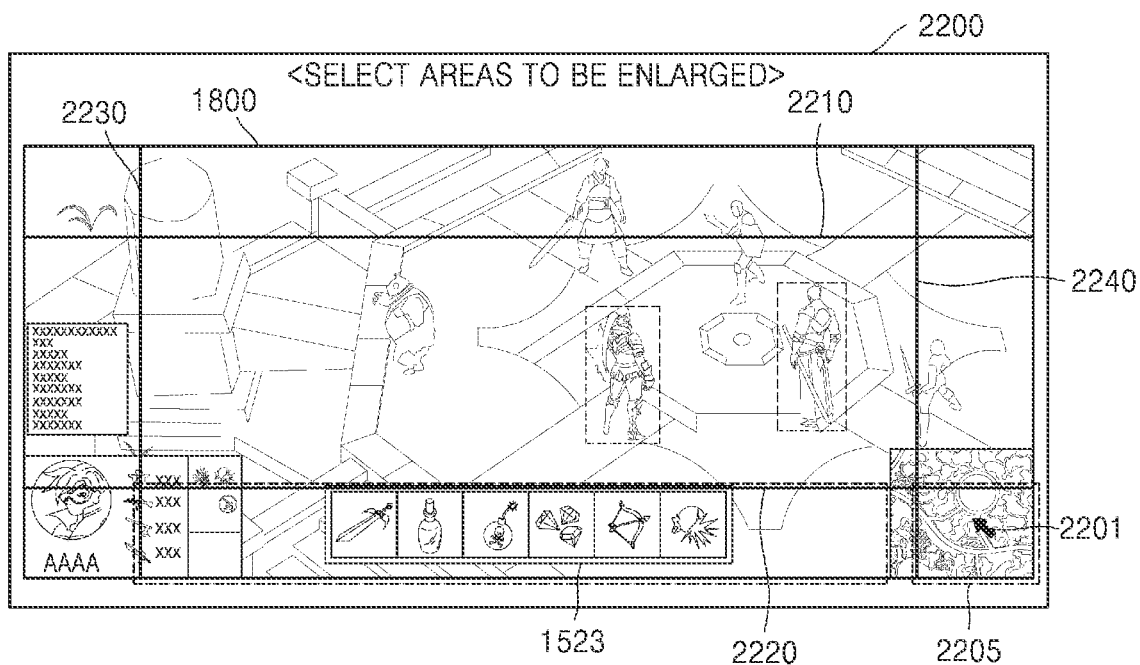
FIG. 22 is diagram illustrating an example operation of identifying a partial area included in a game image according to various embodiments.

FIG. 22 is a diagram illustrating an example operation of identifying a partial area included in a game image according to various embodiments.

Figure 23:
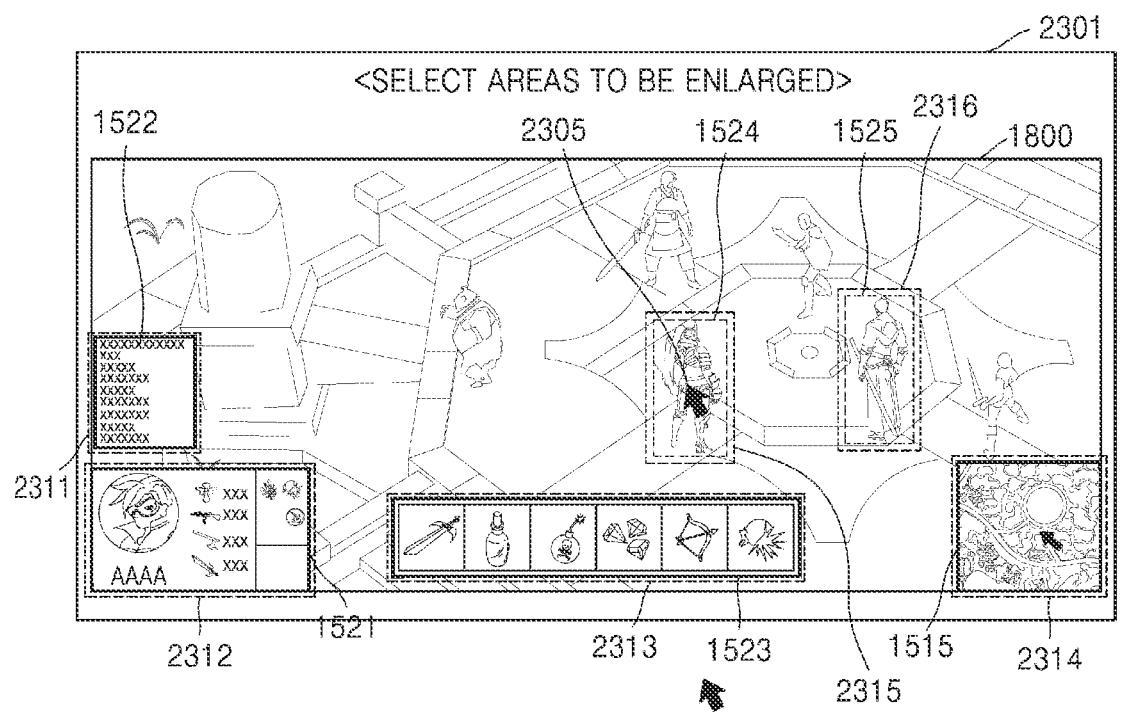
FIG. 23 is diagram illustrating an example operation of identifying a partial area included in a game image according to various embodiments.

FIG. 23 is diagram illustrating an example operation of identifying a partial area included in a game image according to various embodiments.

In FIGS. 22 and 23, the same or similar configurations as those of FIGS. 15 and 18 are denoted by the same reference numerals.

The operating method 2100 may include identifying the first partial area, based on a user input for selecting a guidance area, which is received through the user interface 870 (S2117). For example, operation S2117 may be performed under the control of the processor 810.

Referring to FIGS. 22 and 23, examples of a user interface screen displayed on the display device 100, 800, or 900 according to an embodiment of the disclosure are shown. FIGS. 22 and 23 show examples of the user interface screen output in operation S2115 described above in relation to FIG. 21.

In the following description, a case in which the user interface screens shown in FIGS. 22 and 23 are output on the display device 900 described above in relation to FIG. 9 is described as an example.

Referring to FIG. 22, a user interface screen 2200 output in operation S2115 may be a screen for displaying, on the first image 1800, one or more guidance areas used to select a certain area.

Referring to the example of FIG. 22, the one or more guidance areas displayed on the first image 1800 may be partitioned and defined by a plurality of guidance lines 2210, 2220, 2230, and 2240. For example, when a user selects a certain point using a tool for selecting one point on the user interface screen 2200, e.g., a cursor 2201, an area 2205 corresponding to the point where the cursor 2201 is positioned may be selected as a guidance area. Herein, the guidance area 2205 may be an area defined by the guidance lines 2220 and 2240.

In the above-described example, the processor 810 may identify, as the first partial area, an area where an image object corresponding to the guidance area 2205 selected based on the user input, e.g., a minimap, is displayed. For example, the processor 810 may identify, as the first partial area, an area where an image object displayed in the guidance area 2205 corresponding to the point selected using the cursor 2201 by the user, e.g., a minimap, is displayed. When the area where the minimap is displayed is identified as the first partial area, the processor 810 may provide control to display a full screen (not shown) including the first image 1800 and an enlarged image corresponding to the minimap.

As another example, when the user selects one point in a guidance area 1523 defined by the guidance lines 2220, 2230, and 2240, using the cursor 2201, the processor 810 may identify, as the first partial area, an area where an image object corresponding to the guidance area 1523 selected based on the user input, e.g., the item window 1523, is displayed. When the area where the item window 1523 is displayed is identified as the first partial area, the processor 810 may provide control to display a full screen (not shown) including the first image 1800 and an enlarged image corresponding to the item window 1523.

Although a case in which a plurality of guidance areas are defined and displayed using four guidance lines 2210, 2220, 2230, and 2240 is shown as an example in FIG. 22, the guidance areas may be displayed on the first image 1800 with various positions and sizes in various manners and forms. A plurality of guidance areas may be selected based on a user input, and a plurality of first partial areas separately corresponding to the selected plurality of guidance areas may be identified. Then, the processor 810 may provide control to display a full screen (not shown) including the first image 1800 and a plurality of enlarged images separately corresponding to the identified plurality of first partial areas.

FIG. 23 is a diagram illustrating an example operation of identifying a partial area included in a game image according to various embodiments.

In the example of FIG. 23, a user interface screen 2301 may be a screen for displaying one or more guidance areas 2311, 2312, 2313, 2314, 2315, and 2316 on the first image 1800.

For example, the processor 810 may display the user interface screen 2301 for displaying the one or more guidance areas 2311, 2312, 2313, 2314, 2315, and 2316 on the first image 1800, and identify the first partial area, based on a user input for selecting at least one of the one or more guidance areas 2311, 2312, 2313, 2314, 2315, and 2316.

For example, the processor 810 may extract the one or more guidance areas 2311, 2312, 2313, 2314, 2315, and 2316 included in the first image 1800, using the partial area identification or image object recognition method described above in relation to FIG. 19. The display device 900 may display the user interface screen 2301 for displaying the extracted one or more guidance areas 2311, 2312, 2313, 2314, 2315, and 2316 on the first image 1800. Then, a user may select at least one of the one or more guidance areas 2311, 2312, 2313, 2314, 2315, and 2316 displayed on the first image 1800. The processor 810 may identify, as the first partial area, the guidance area 2311, 2312, 2313, 2314, 2315, or 2316 selected based on the user input.

For example, when the user selects the guidance area 2315 using a cursor 2305, the processor 810 may identify the guidance area 2315 as the first partial area based on the user input, and control the image processor 825 to generate an enlarged image corresponding to the identified first partial area.

Figure 24:
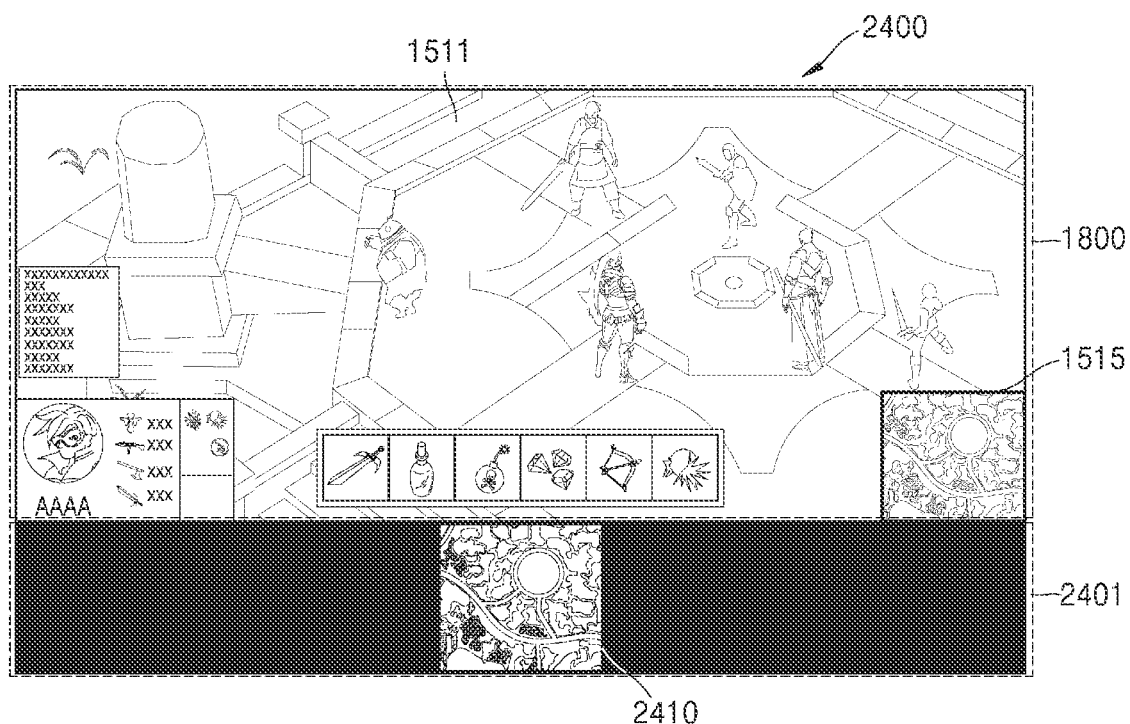
FIG. 24 is a diagram illustrating an example of a full screen including a game image and an enlarged image according to various embodiments.

FIG. 24 is a diagram illustrating an example of a full screen including a game image and an enlarged image according to various embodiments. In FIG. 24, the same or similar configurations as those of FIGS. 15 and 18 are denoted by the same reference numerals.

Referring to FIG. 24, an example of a full screen displayed on the display device 100, 800, or 900 according to an embodiment of the disclosure is shown. A case in which a full screen 2400 shown in FIG. 24 is output on the display device 900 described above in relation to FIG. 9 is described as an example.

Referring to FIG. 24, the full screen 2400 may be a screen output in operation S1017 shown in FIGS. 10 to 21. In FIG. 24, a case in which the first partial area identified in operation S2117 is an area where the minimap 1515 is displayed is shown as an example.

In an embodiment of the disclosure, to display the first full screen in operation S1017, the processor 810 may adjust at least one of the size or position of the first enlarged image included in the first full screen, based on the first aspect ratio and a full screen aspect ratio of the display 820.

For example, the full screen 2400 may be a screen including the first image 1800 and a first enlarged image 2410 corresponding to the first partial area identified in operation S2117 (e.g., an area where the minimap 1515 is displayed). For example, the processor 810 may generate the first full screen so as to maximize/increase screen use efficiency. Herein, when the screen use efficiency is maximized/increased, it may refer, for example, to display of a meaningless image (e.g., a black area 2401) being minimized/reduced and display of a meaningful image is maximized/increased in a full screen.

Figure 25:
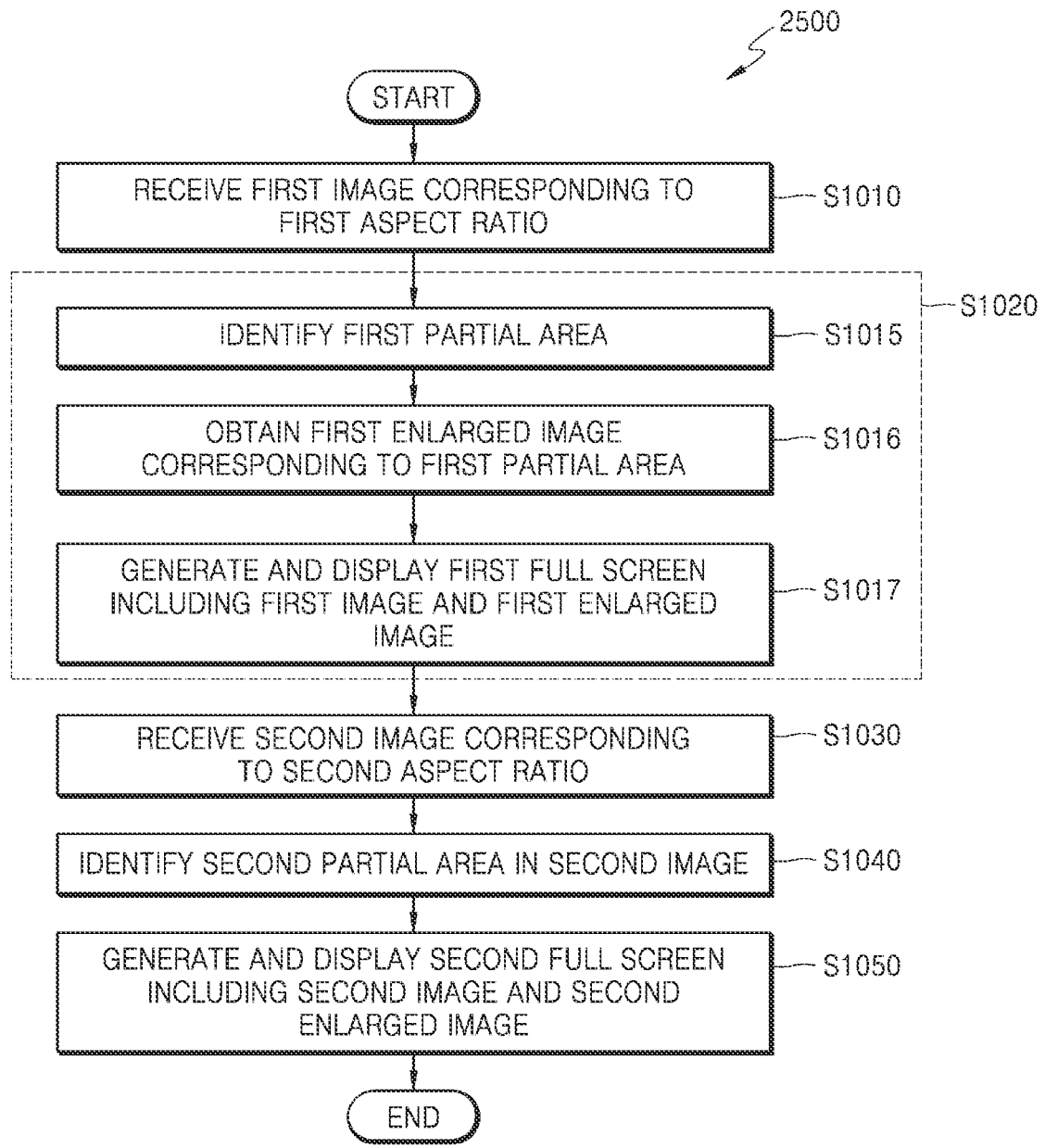
FIG. 25 is a flowchart illustrating an example method of operating a display device, according to various embodiments.

FIG. 25 is a flowchart illustrating an example method of operating a display device, according to various embodiments. In FIG. 25, the same or similar operations as those of FIGS. 10 to 21 are denoted by the same reference numerals.

In the following description, a case in which a method 2500 of operating a display device is performed by the display device 900 described above in relation to FIG. 9 is described as an example.

Referring to FIG. 25, after operation S1015, the operating method 2500 may further include obtaining a first enlarged image corresponding to the first partial area (S1016). The first enlarged image may be obtained using the following methods.

For example, in operation S1016, the display device 900 may request the source device 901 to transmit image data corresponding to the first partial area identified in S1015, and the source device 901 may transmit the image data corresponding to the first partial area to the display device 900 in response to the request. Herein, the image data transmitted from the source device 901 may be original image data of the first partial area. Then, the image processor 825 may generate the first enlarged image based on the received image data.

As another example, in operation S1016, the first partial area identified in operation S1015 is cut out from the first image received in operation S1010, and an enlarged image may be generated by enlarging the cut first partial area. That is, the image processor 825 may generate the enlarged image by cutting out the identified first partial area from the first image received in operation S1010.

A second enlarged image corresponding to the second partial area identified in operation S1040 may be obtained in the same manner as the above-described method of obtaining the first enlarged image. For example, the display device 900 may request the source device 901 to transmit image data corresponding to the identified second partial area, and the source device 901 may transmit the image data corresponding to the second partial area to the display device 900 in response to the request. Herein, the image data transmitted from the source device 901 may be original image data of the second partial area. Then, the image processor 825 may generate the second enlarged image based on the received image data. As another example, the display device 900 may cut out the second partial area identified in operation S1040 from the second image received in operation S1030, and an enlarged image may be generated by enlarging the cut second partial area. That is, the image processor 825 may generate the enlarged image by cutting out the identified second partial area from the second image received in operation S1030.

A method of operating a display device, according to an embodiment of the disclosure, may be implemented in the form of program commands that can be executed through various computer means, and be recorded on a computer-readable medium. An embodiment of the disclosure may be implemented in the form of a computer-readable recording medium having recorded thereon one or more programs including instructions for executing the operating method of the display device.

The computer-readable medium may include program commands, data files, data structures, or combinations thereof. The program commands recorded on the medium may be those specially designed and constructed for the purposes of the disclosure, or they may be of the kind well known and available to one of ordinary skill in the art of computer software. Examples of the computer-readable recording medium include magnetic media (e.g., hard disks, floppy disks, and magnetic tape), optical media (e.g., CD-ROMs or DVDs), magneto-optical media (e.g., floptical disks), and hardware devices (e.g., ROMs, RAMs, or flash memories, etc.) that are specially configured to store and execute program commands. Examples of the program commands include both machine code, such as produced by a compiler, and high-level language code that may be executed by the computer using an interpreter.

A machine-readable storage medium may be provided in the form of a non-transitory storage medium. When the storage medium is 'non-transitory', the storage medium is tangible and does not include signals (e.g., electromagnetic waves), and it does not limit that data is semi-permanently or temporarily stored in the storage medium. For example, the 'non-transitory storage medium' may include a buffer storing data temporarily.

According to an embodiment of the disclosure, the method according to various embodiments of the disclosure may be included and provided in a computer program product. The computer program product may be traded as a commercial product between sellers and purchasers. The computer program product may be distributed in the form of a machine-readable storage medium (e.g., a compact disc read only memory (CD-ROM)), or be electronically distributed (e.g., downloaded or uploaded) via an application store (e.g., Play Store™) or directly between two user devices (e.g., smartphones). For electronic distribution, at least a part of the computer program product (e.g., a downloadable app) may be temporarily generated or be at least temporarily stored in a machine-readable storage medium, e.g., a memory of a server of a manufacturer, a server of an application store, or a relay server.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A display device comprising:
   a display;
   a communication interface comprising communication circuitry configured to communicate with a source device; and
   a processor comprising processor circuitry configured to execute at least one instruction to:
      receive, from the source device, a first image corresponding to a first aspect ratio, wherein the first aspect ratio is different than a physical aspect ratio of the display;
      based on a first partial area being identified in the first image, control the display to display a first full screen comprising the first image and a first enlarged image corresponding to the first partial area, wherein the first enlarged image is displayed on at least part of a remaining area other than where the first image is displayed;

based on a second image corresponding to a second aspect ratio different from the first aspect ratio being received from the source device, identify, in the second image, a second partial area corresponding to the first partial area, based on the first and second aspect ratios; and control the display to display, instead of the previously displayed first full screen, a second full screen comprising the second image and a second enlarged image corresponding to the identified second partial area, wherein the second enlarged image is displayed on at least part of a remaining area other than where the second image is displayed.

2. The display device of claim 1, wherein the processor is further configured to execute the at least one instruction to:
identify, in the second image, the second partial area comprising the same image object as an image object included in the first partial area in the first image, based on the first and second aspect ratios; and
obtain the second enlarged image corresponding to the identified second partial area.

3. The display device of claim 1, wherein the processor is further configured to execute the at least one instruction to: control the communication interface to receive the second image having the second aspect ratio from the source device, based on an input received while the first image is being received from the source device.

4. The display device of claim 1, wherein the processor is further configured to execute the at least one instruction to:
identify, as the first partial area, an area including at least one of a moving object, a minimap, an item window, a character window, a chat window, or a current status information window, in the first image; and
obtain the first enlarged image corresponding to the first partial area.

5. The display device of claim 1, wherein the processor is further configured to execute the at least one instruction to identify the first partial area, based on an input for selecting a partial area in the first image.

6. The display device of claim 1, further comprising a user interface configured to receive an input,
wherein the processor is further configured to execute the at least one instruction to:
control the display to display a user interface screen displaying one or more guidance areas on the first image; and
identify the first partial area, based on an input for selecting at least one of the one or more guidance areas.

7. The display device of claim 1, wherein the processor is further configured to execute the at least one instruction to:
recognize one or more image objects corresponding to one or more of a minimap, a moving object, an item window, a character window, a chat window, and a current status information window in the first image;
display a user interface screen for selecting at least one of the recognized one or more image objects; and
identify the first partial area, based on an input for selecting at least one of the one or more image objects.

8. The display device of claim 1, wherein the processor is further configured to execute the at least one instruction to: based on an aspect ratio of the display being same as the second aspect ratio, split a full screen of the display into two partial screens, and control the display to display the second image in one partial screen and display the second enlarged image in the other partial screen.

9. The display device of claim 1, wherein the processor is further configured to execute the at least one instruction to: based on an aspect ratio of the display being different from the second aspect ratio, control the display to display the second enlarged image on at least a part of a remaining area other than an area where the second image is displayed on a full screen of the display.

10. The display device of claim 9, wherein the processor is further configured to execute the at least one instruction to:
adjust a size the second enlarged image to increase screen use efficiency of the remaining area; and
display the size-adjusted second enlarged image on the remaining area.

11. The display device of claim 1, wherein the processor is further configured to execute the at least one instruction to: adjust at least one of a size or a position of the second enlarged image included in the second full screen, based on the second aspect ratio and a full screen aspect ratio of the display.

12. The display device of claim 1, wherein the first image comprises an image corresponding to game content corresponding to the first aspect ratio, and
wherein the second image comprises an image corresponding to game content corresponding to the second aspect ratio.

13. The display device of claim 1, wherein the processor is further configured to execute the at least one instruction to:
identify, as the first partial area, an area including a minimap in the first image corresponding to a reproduction image of game content;
generate a first enlarged image corresponding to the first partial area; and
control the display to display the first full screen comprising the first enlarged image and the first image.

14. A method of operating a display device, the method comprising:
receiving, from a source device, a first image corresponding to a first aspect ratio, wherein the first aspect ratio is different than a physical aspect ratio of a display;
based on a first partial area being identified in the first image, displaying a first full screen comprising the first image and a first enlarged image corresponding to the first partial area, wherein the first enlarged image is displayed on at least part of a remaining area other than where the first image is displayed;
receiving, from the source device, a second image corresponding to a second aspect ratio different from the first aspect ratio;
identifying, in the second image, a second partial area corresponding to the first partial area based on the first and second aspect ratios; and
displaying, instead of the previously displayed first full screen, a second full screen comprising the second image and a second enlarged image corresponding to the identified second partial area, wherein the second enlarged image is displayed on at least part of a remaining area other than where the second image is displayed.

15. The method of claim 14, wherein the identifying of the second partial area comprises:
identifying, in the second image, the second partial area comprising the same image object as an image object included in the first partial area in the first image, based on the first and second aspect ratios; and
obtaining the second enlarged image corresponding to the identified second partial area.

16. The method of claim 14, wherein the displaying of the first full screen comprises:
identifying, as the first partial area, an area where at least one of a moving object, a minimap, an item window, a character window, a chat window, or a current status information window, in the first image; and
obtaining the first enlarged image corresponding to the first partial area.

17. The method of claim 14, further comprising:
displaying a user interface screen for displaying one or more guidance areas on the first image; and
identifying the first partial area, based on an input for selecting at least one of the one or more guidance areas.

18. The method of claim 14, further comprising:
recognizing one or more image objects corresponding to one or more of a minimap, a moving object, an item window, a character window, a chat window, and a current status information window in the first image;
displaying a user interface screen for selecting at least one of the recognized one or more image objects; and
identifying the first partial area, based on an input for selecting at least one of the one or more image objects.

19. The method of claim 14, wherein the displaying of the second full screen comprises: based on an aspect ratio of the display being different from the second aspect ratio, displaying the second enlarged image on at least a part of a remaining area other than an area where the second image is displayed on a full screen of a display in the display device.

20. The method of claim 14, wherein the displaying of the second full screen further comprises: adjusting at least one of a size or a position of the second enlarged image included in the second full screen, based on the second aspect ratio and a full screen aspect ratio of a display in the display device.

* * * * *